(12) United States Patent
Plank et al.

(10) Patent No.: US 11,550,379 B2
(45) Date of Patent: Jan. 10, 2023

(54) POWER OVER ETHERNET (POE) ADAPTER FOR BUILDING CONTROLLERS

(71) Applicant: Johnson Controls Technology Company, Auburn Hills, MI (US)

(72) Inventors: Matthew T. Plank, Waukesha, WI (US); Daniel J. Sonnemann, Waukesha, WI (US); Kevin F. Hughes, Milwaukee, WI (US); Musa J. Abdeljaber, Franklin, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 161 days.

(21) Appl. No.: 16/881,258

(22) Filed: May 22, 2020

(65) Prior Publication Data

US 2020/0371572 A1 Nov. 26, 2020

Related U.S. Application Data

(60) Provisional application No. 62/852,582, filed on May 24, 2019.

(51) Int. Cl.
*G06F 1/26* (2006.01)
*H04L 12/10* (2006.01)
*H04L 12/40* (2006.01)

(52) U.S. Cl.
CPC .............. *G06F 1/266* (2013.01); *H04L 12/10* (2013.01); *H04L 12/40045* (2013.01)

(58) Field of Classification Search
CPC .... G06F 1/266; H04L 12/10; H04L 12/40045
USPC ....................................................... 713/300
See application file for complete search history.

(56) References Cited

U.S. PATENT DOCUMENTS

| | | | |
|---|---|---|---|
| 10,116,517 B1 | 10/2018 | Drury | |
| 10,411,984 B2 | 9/2019 | Hoglund | |
| 2012/0110356 A1* | 5/2012 | Yousefi | G06F 1/26 713/320 |
| 2015/0115741 A1* | 4/2015 | Dawson | H02J 4/00 307/125 |
| 2016/0064939 A1* | 3/2016 | Lai | H04L 12/10 307/1 |
| 2016/0127135 A1* | 5/2016 | Balasubramanian | H04L 12/10 713/300 |
| 2016/0164229 A1* | 6/2016 | Boban | H04L 12/4625 439/620.21 |

(Continued)

FOREIGN PATENT DOCUMENTS

| | | | | |
|---|---|---|---|---|
| EP | 2360868 A1 * | 8/2011 | ........... | H04L 12/413 |
| WO | WO-2019023731 A1 * | 2/2019 | ......... | H01R 13/6581 |

*Primary Examiner* — Mark A Connolly
(74) *Attorney, Agent, or Firm* — Foley & Lardner LLP

(57) ABSTRACT

The present disclosure envisages a building management system for a building. The building management system includes a building controller, a power over Ethernet (PoE) adapter, and a PoE source. The building controller is configured to operate one or more building equipment of the building, wherein the building controller is powered via alternating current (AC) power. The power over Ethernet (PoE) adapter comprises one or more circuits configured to receive PoE from the PoE source, wherein the PoE source is configured to generate the PoE having direct current (DC) power. Further, the PoE adapter is configured to generate AC power based on the PoE received from the PoE source, and provide the AC power to the building controller.

20 Claims, 16 Drawing Sheets

(56) References Cited

U.S. PATENT DOCUMENTS

| | | |
|---|---|---|
| 2017/0357607 A1 | 12/2017 | Cayemberg et al. |
| 2018/0314219 A1* | 11/2018 | Gamroth .............. G05B 19/042 |
| 2019/0278347 A1* | 9/2019 | Goergen ........... H04L 12/40045 |
| 2019/0280887 A1* | 9/2019 | Telefus ..................... H02J 3/00 |
| 2019/0349218 A1 | 11/2019 | Hoglund et al. |
| 2020/0044876 A1 | 2/2020 | Piccolo et al. |

* cited by examiner

POWER OVER ETHERNET (POE) ADAPTER FOR BUILDING CONTROLLERS

CROSS-REFERENCE TO RELATED PATENT APPLICATION

This application claims the benefit of and priority to U.S. Provisional Patent Application No. 62/852,582 filed May 24, 2019, the entire disclosure of which is incorporated by reference herein.

BACKGROUND

The present disclosure relates generally to Power over Ethernet (PoE). The present disclosure relates more particularly to PoE in building management systems.

A building management system (BMS) is, in general, a system of devices configured to control, monitor, and manage equipment in or around a building or building area. A BMS can include a heating, ventilation, or air conditioning (HVAC) system, a security system, a lighting system, a fire alerting system, another system that is capable of managing building functions or devices, or any combination thereof. BMS devices may be installed in any environment (e.g., an indoor area or an outdoor area) and the environment may include any number of buildings, spaces, zones, rooms, or areas. A BMS may include METASYS® or VERASYS® building controllers or other devices sold by Johnson Controls, Inc., as well as building devices and components from other sources.

Conventionally, wiring a building controller involved dependencies from ventilation installation, damper installation, low power voltage wiring, master slave token passing (MSPT) wiring, and/or Ethernet installation. Therefore, instead of relying on multiple wiring schemes, e.g., a power wiring scheme and a separate networking communication scheme, using PoE allows for a single cable to be installed (an Ethernet cable) which rationalizes installation costs in half.

Therefore, there is felt a need to provide a power over Ethernet (PoE) adapter for building controllers that alleviates the drawback(s) of conventional multiple wiring schemes.

SUMMARY

One implementation of the present disclosure is a building management system for a building. The building management system includes a building controller, a power over Ethernet (PoE) adapter, and a PoE source. The building controller is configured to operate one or more building equipment of the building, wherein the building controller is powered via alternating current (AC) power. The power over Ethernet (PoE) adapter includes one or more circuits configured to receive PoE generated by the PoE source, wherein the PoE is direct current (DC) power. One or more circuits of the PoE adapter is enabled to generate the AC power based on the PoE received from the PoE source, and provide the AC power to the building controller.

In some embodiments, the building controller and the PoE adapter are separate units connected via one or more wires.

In some embodiments, the PoE is at 48 volts DC and the AC power is at 24 volts.

In some embodiments, the building controller is housed within an enclosure defined by an enclosure faceplate and an enclosure body. The enclosure faceplate is detachably coupled to the enclosure body. In some embodiments, the PoE adapter is configured to mount to the enclosure faceplate of the building controller.

In some another embodiments, the building controller is housed within an enclosure having an enclosure faceplate and an enclosure body. The enclosure faceplate is configured to be detachably coupled to the enclosure body, and the PoE adapter is positioned within the enclosure faceplate.

In one embodiment, the PoE adapter may be mounted on an operative inner surface of the enclosure faceplate, i.e., the PoE adapted is positioned within the enclosure of the building controller.

In some embodiments, the PoE adapter include an Ethernet breakout circuit and a power circuit. The Ethernet breakout circuit is configured to provide one or more data communications connections between the PoE source and the building controller and provide one or more PoE connections between the PoE source and one or more power circuits of the PoE adapter.

In some embodiments, the power circuit includes a step down unit and an inverter unit. The step down unit is configured to step down the PoE to a second power and the inverter circuit is configured to generate the AC power based on the second power.

In one embodiment, the inverter unit includes an a stable monovibrator circuit, or a transformer, or both. In another embodiment, the step down unit is at least one of a buck converter circuit or a linear regulator.

In some embodiments, the buck converter circuit includes a heat-sink.

Another implementation of the present disclosure is a building controller, the building controller including one or more controller circuits (also referred as "circuit board") configured to operate one or more equipment of a building management system, wherein the one or more controller circuits are powered via alternating current (AC) power. The building controller further including an enclosure including an enclosure faceplate and an enclosure body. The enclosure faceplate is configured to connect or disconnect from the enclosure body, wherein the enclosure faceplate is further enabled to facilitate mounting of a power over Ethernet (PoE) adapter. The PoE adapter includes one or more adapter circuits configured to receive PoE from a PoE source, the PoE source is configured to generate the PoE, wherein the PoE is direct current (DC) power, and subsequently the PoE adapter is enabled to generate the AC power based on the PoE received from the PoE source. The AC power generated by the PoE adapter is provided to one or more controller circuits, thereby powering the controller circuits and enabling the controller circuits to operate one or more equipment of the building management system.

In some embodiments, the PoE is at 48 volts DC and the AC power is at 24 volts.

In some embodiments, the enclosure faceplate further includes an inside and an outside, wherein the PoE adapter is coupled to the inside of the enclosure faceplate.

In some embodiments, the one or more adapter circuits of the PoE adapter include an Ethernet breakout circuit. In some embodiments, the Ethernet breakout circuit is configured to provide one or more data communications connections between the PoE source and the building controller and provide one or more PoE connections between the PoE source and one or more power circuits of the one or more adapter circuits of the PoE adapter.

In some embodiments, one or more power circuits include a step down unit (hereinafter also referred as "step down circuit") that is configured to step down the PoE to a second power and an inverter unit (hereinafter also referred as "inverter circuit") configured to generate the AC power based on the second power.

Another implementation of the present disclosure is an adapter faceplate for an enclosure body of a building controller. The adapter faceplate having an inside and an outside, wherein a power over Ethernet (PoE) adapter is mounted to the inside of the adapter faceplate, wherein the adapter faceplate is configured to connect to the enclosure body of the building controller. The PoE adapter is configured to receive PoE from a PoE source, the PoE source is configured to generate the PoE, wherein the PoE is direct current (DC) power, and subsequently the PoE adapter is enabled to generate the AC power based on the PoE received from the PoE source, and provide the AC power to the building controller.

In some embodiments, the PoE is at 48 volts DC and the AC power is at 24 volts.

In some embodiments, the PoE adapter includes one or more adapter circuits, wherein the one or more adapter circuits of the PoE adapter include an Ethernet breakout circuit. In some embodiments, the Ethernet breakout circuit is configured to provide one or more data communications connections between the PoE source and the building controller; and provide one or more PoE connections between the PoE source and one or more power circuits of the one or more adapter circuits of the PoE adapter.

In some embodiments, the one or more power circuits include a step down circuit configured to step down a power level of the PoE to a second power level and an inverter circuit configured to generate the AC power based on the second power level.

In some embodiments, the step down circuit is at least one of a buck converter circuit or a linear regulator.

In some embodiments, the inverter circuit includes an a stable monovibrator circuit and a transformer.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Referring generally to the FIGURES, a PoE adapter for building controllers is shown, according to various exemplary embodiments. Wiring a building controller may have dependencies from ventilation installation, damper installation, low power voltage wiring, master slave token passing (MSPT) wiring, and/or Ethernet installation. By using a PoE adapter to convert PoE to AC power for a building controller, existing building controller hardware can be powered via PoE. For example, the PoE adapter could connect both power and data between a PoE source and the building controller, the PoE converting 52 VDC at 0.4 A (the PoE) to 24 VAC at 0.8 A to power the building controller and facilitate data communications.

Instead of relying on multiple wiring schemes, e.g., a power wiring scheme and a separate networking communication scheme, using PoE allows for a single cable to be installed (an Ethernet cable) cutting installation costs in half. In some embodiments, the PoE adapter is a standalone device separate from the building controller. The PoE mounted on or next to the controller can transform power for the building controller and connect data connections to data pins of the controller and power connections to power pins of the building controller. Furthermore, in some embodiments, the PoE adapter can be integrated within a faceplate of the building controller. To transform a building controller from a non-PoE building controller to a PoE building controller, a technician may simply replace a first faceplate of the building controller with the faceplate including the integrated PoE adapter.

Building and HVAC System

Figure 1:
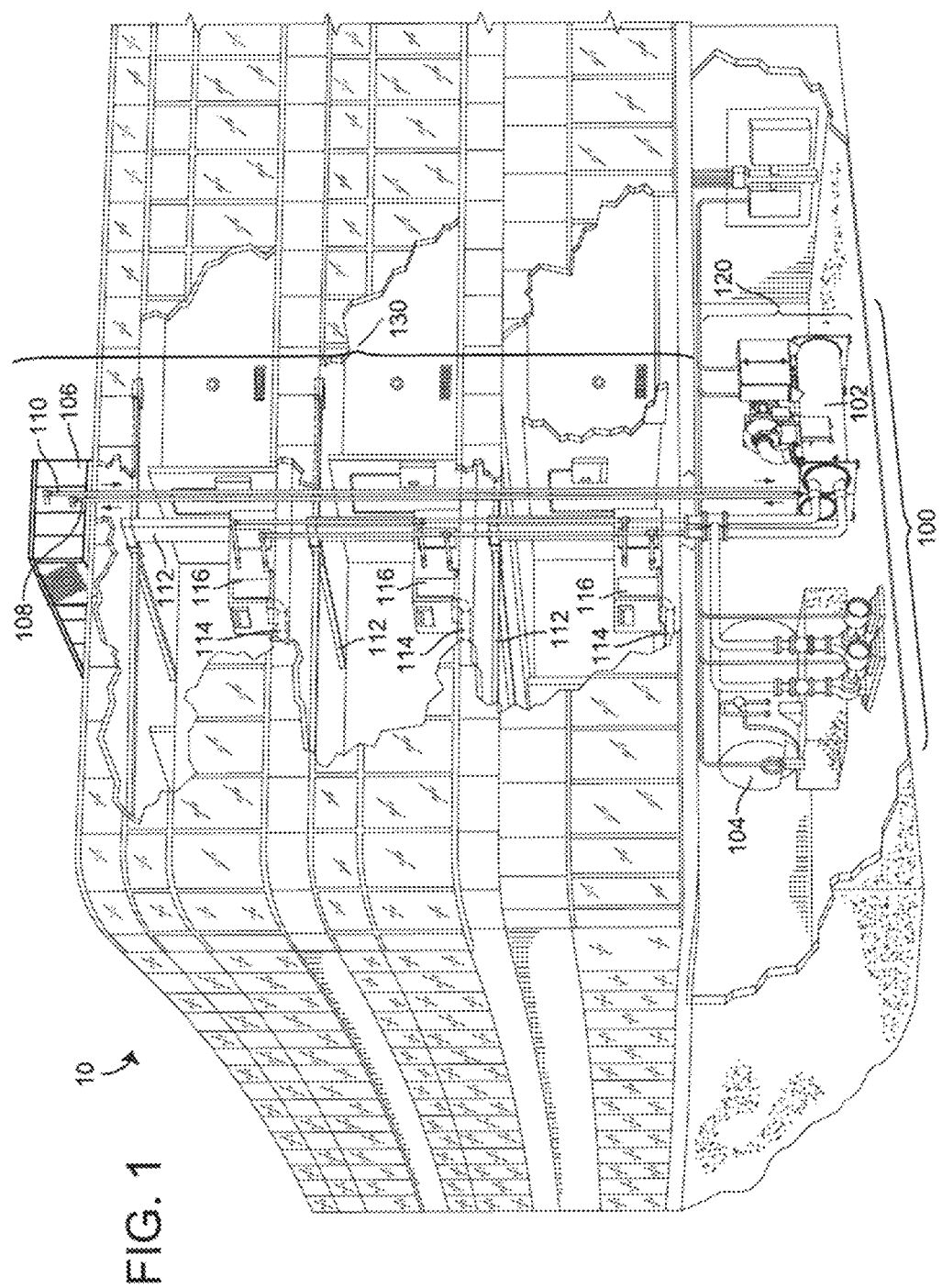
FIG. 1 is drawing of a building equipped with a heating, ventilating, and air conditioning (HVAC) system, according to some embodiments.

Referring now to FIG. 1, an exemplary building and HVAC system in which the systems and methods of the present invention can be implemented are shown, according to an exemplary embodiment. In FIG. 1, a perspective view of a building 10 is shown. Building 10 is served by a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Building Management System

Figure 2:
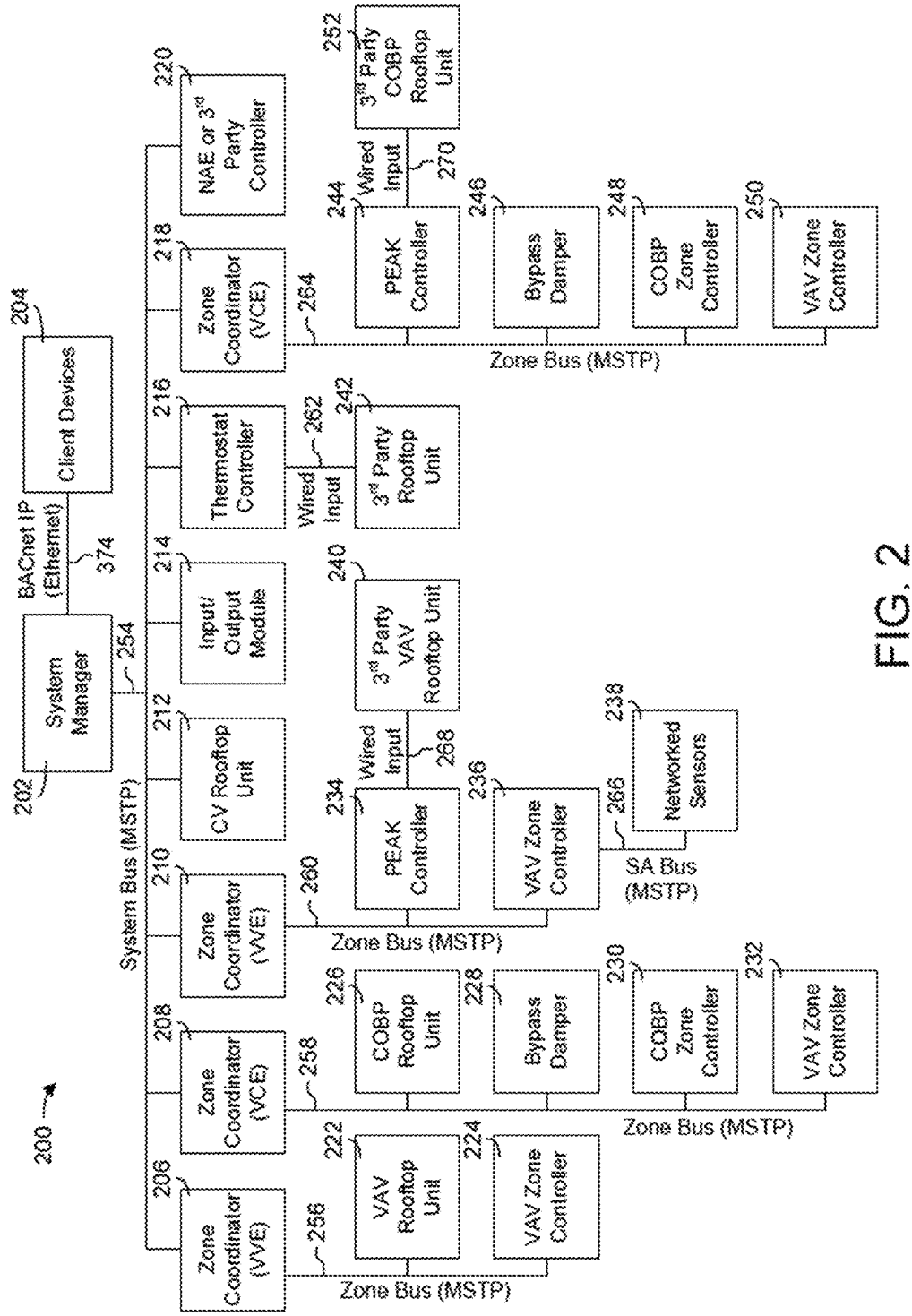
FIG. 2 is a block diagram of a building management system (BMS) which can be used to monitor and control the building and HVAC system of FIG. 1, according to some embodiments.

Referring now to FIG. 2, a block diagram of a building management system (BMS) 200 is shown, according to an exemplary embodiment. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. BMS 200 can be used to monitor and control the devices of HVAC system 100 and/or airside system 200 (e.g., HVAC equipment) as well as other types of BMS devices (e.g., lighting equipment, security equipment, etc.).

In brief overview, BMS 200 provides a system architecture that facilitates automatic equipment discovery and equipment model distribution. Equipment discovery can occur on multiple levels of BMS 200 across multiple different communications busses (e.g., a system bus 254, zone buses 256-260 and 264, sensor/actuator bus 266, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 200 can begin interacting with the new device (e.g., sending control signals, using data from the device) without user interaction.

Some devices in BMS 200 present themselves to the network using equipment models. An equipment model defines equipment object attributes, view definitions, schedules, trends, and the associated BACnet value objects (e.g., analog value, binary value, multistate value, etc.) that are used for integration with other systems. An equipment model for a device can include a collection of point objects that provide information about the device (e.g., device name, network address, model number, device type, etc.) and store present values of variables or parameters used by the device. For example, the equipment model can include point objects (e.g., standard BACnet point objects) that store the values of input variables accepted by the device (e.g., setpoint, control parameters, etc.), output variables provided by the device (e.g., temperature measurement, feedback signal, etc.), configuration parameters used by the device (e.g., operating mode, actuator stroke length, damper position, tuning parameters, etc.). The point objects in the equipment model can be mapped to variables or parameters stored within the device to expose those variables or parameters to external systems or devices.

Some devices in BMS 200 store their own equipment models. Other devices in BMS 200 have equipment models stored externally (e.g., within other devices). For example, a zone coordinator 208 can store the equipment model for a bypass damper 228. In some embodiments, zone coordinator 208 automatically creates the equipment model for bypass damper 228 or other devices on zone bus 258. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 2, BMS 200 is shown to include a system manager 202; several zone coordinators 206, 208, 210 and 218; and several zone controllers 224, 230, 232, 236, 248, and 250. System manager 202 can communicate with client devices 204 (e.g., user devices, desktop computers, laptop computers, mobile devices, etc.) via a data communications link 374 (e.g., BACnet IP, Ethernet, wired or wireless communications, etc.). System manager 202 can provide a user interface to client devices 204 via data communications link 374. The user interface may allow users to monitor and/or control BMS 200 via client devices 204.

In some embodiments, system manager 202 is connected with zone coordinators 206-210 and 218 via a system bus 254. System bus 254 can include any of a variety of communications hardware (e.g., wire, optical fiber, terminals, etc.) configured to facilitate communications between system manager and other devices connected to system bus 254. Throughout this disclosure, the devices connected to system bus 254 are referred to as system bus devices. System manager 202 can be configured to communicate with zone coordinators 206-210 and 218 via system bus 254 using a master-slave token passing (MSTP) protocol or any other communications protocol. System bus 254 can also connect system manager 202 with other devices such as a constant volume (CV) rooftop unit (RTU) 212, an input/output module (IOM) 214, a thermostat controller 216 (e.g., a TEC2000 series thermostat controller), and a network automation engine (NAE) or third-party controller 220. RTU 212 can be configured to communicate directly with system manager 202 and can be connected directly to system bus 254. Other RTUs can communicate with system manager 202 via an intermediate device. For example, a wired input 262 can connect a third-party RTU 242 to thermostat controller 216, which connects to system bus 254.

System manager 202 can provide a user interface for any device containing an equipment model. Devices such as zone coordinators 206-210 and 218 and thermostat controller 216 can provide their equipment models to system manager 202 via system bus 254. In some embodiments, system manager 202 automatically creates equipment models for connected devices that do not contain an equipment model (e.g., IOM 214, third party controller 220, etc.). For example, system manager 202 can create an equipment model for any device that responds to a device tree request. The equipment models created by system manager 202 can be stored within system manager 202. System manager 202 can then provide a user interface for devices that do not contain their own equipment models using the equipment models created by system manager 202. In some embodiments, system manager 202 stores a view definition for each type of equipment connected via system bus 254 and uses the stored view definition to generate a user interface for the equipment.

Each zone coordinator 206-210 and 218 can be connected with one or more of zone controllers 224, 230-232, 236, and 248-250 via zone buses 256, 258, 260, and 264. Zone busses 256, 258, 260, and 264 can include any of a variety of communications hardware (e.g., wire, optical fiber, terminals, etc.) configured to facilitate communications between a zone coordinator and other devices connected to the corresponding zone bus. Throughout this disclosure, the devices connected to zone busses 256, 258, 260, and 264 are referred to as zone bus devices. Zone coordinators 206-210 and 218 can communicate with zone controllers 224, 230-232, 236, and 248-250 via zone busses 256-260 and 264 using a MSTP protocol or any other communications protocol. Zone busses 256-260 and 264 can also connect zone coordinators 206-210 and 218 with other types of devices such as variable air volume (VAV) RTUs 222 and 240, changeover bypass (COBP) RTUs 226 and 252, bypass dampers 228 and 246, and PEAK controllers 234 and 244.

Zone coordinators 206-210 and 218 can be configured to monitor and command various zoning systems. In some embodiments, each zone coordinator 206-210 and 218 monitors and commands a separate zoning system and is connected to the zoning system via a separate zone bus. For example, zone coordinator 206 can be connected to VAV RTU 222 and zone controller 224 via zone bus 256. Zone coordinator 208 can be connected to COBP RTU 226, bypass damper 228, COBP zone controller 230, and VAV zone controller 232 via zone bus 258. Zone coordinator 210 can be connected to PEAK controller 234 and VAV zone controller 236 via zone bus 260. Zone coordinator 218 can be connected to PEAK controller 244, bypass damper 246, COBP zone controller 248, and VAV zone controller 250 via zone bus 264.

A single model of zone coordinator 206-210 and 218 can be configured to handle multiple different types of zoning systems (e.g., a VAV zoning system, a COBP zoning system, etc.). Each zoning system can include a RTU, one or more zone controllers, and/or a bypass damper. For example, zone coordinators 206 and 210 are shown as Verasys VAV engines (VVEs) connected to VAV RTUs 222 and 240, respectively. Zone coordinator 206 is connected directly to VAV RTU 222 via zone bus 256, whereas zone coordinator 210 is connected to a third-party VAV RTU 240 via a wired input 268 provided to PEAK controller 234. Zone coordinators 208 and 218 are shown as Verasys COBP engines (VCEs) connected to COBP RTUs 226 and 252, respectively. Zone coordinator 208 is connected directly to COBP RTU 226 via zone bus 258, whereas zone coordinator 218 is connected to a third-party COBP RTU 252 via a wired input 270 provided to PEAK controller 244.

Zone controllers 224, 230-232, 236, and 248-250 can communicate with individual BMS devices (e.g., sensors, actuators, etc.) via sensor/actuator (SA) busses. For example, VAV zone controller 236 is shown connected to networked sensors 238 via SA bus 266. Networked sensors 238 can include, for example, temperature sensors, humidity sensors, pressure sensors, lighting sensors, security sensors, or any other type of device configured to measure and/or provide an input to zone controller 236. Zone controller 236 can communicate with networked sensors 238 using a MSTP protocol or any other communications protocol. Although only one SA bus 266 is shown in FIG. 2, it should be understood that each zone controller 224, 230-232, 236, and 248-250 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 224, 230-232, 236, and 248-250 can be configured to monitor and control a different building zone. Zone controllers 224, 230-232, 236, and 248-250 can use the inputs and outputs provided via their SA busses to monitor and control various building zones. For example, a zone controller 236 can use a temperature input received from networked sensors 238 via SA bus 266 (e.g., a measured temperature of a building zone) as feedback in a temperature control algorithm. Zone controllers 224, 230-232, 236, and 248-250 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Figure 3:
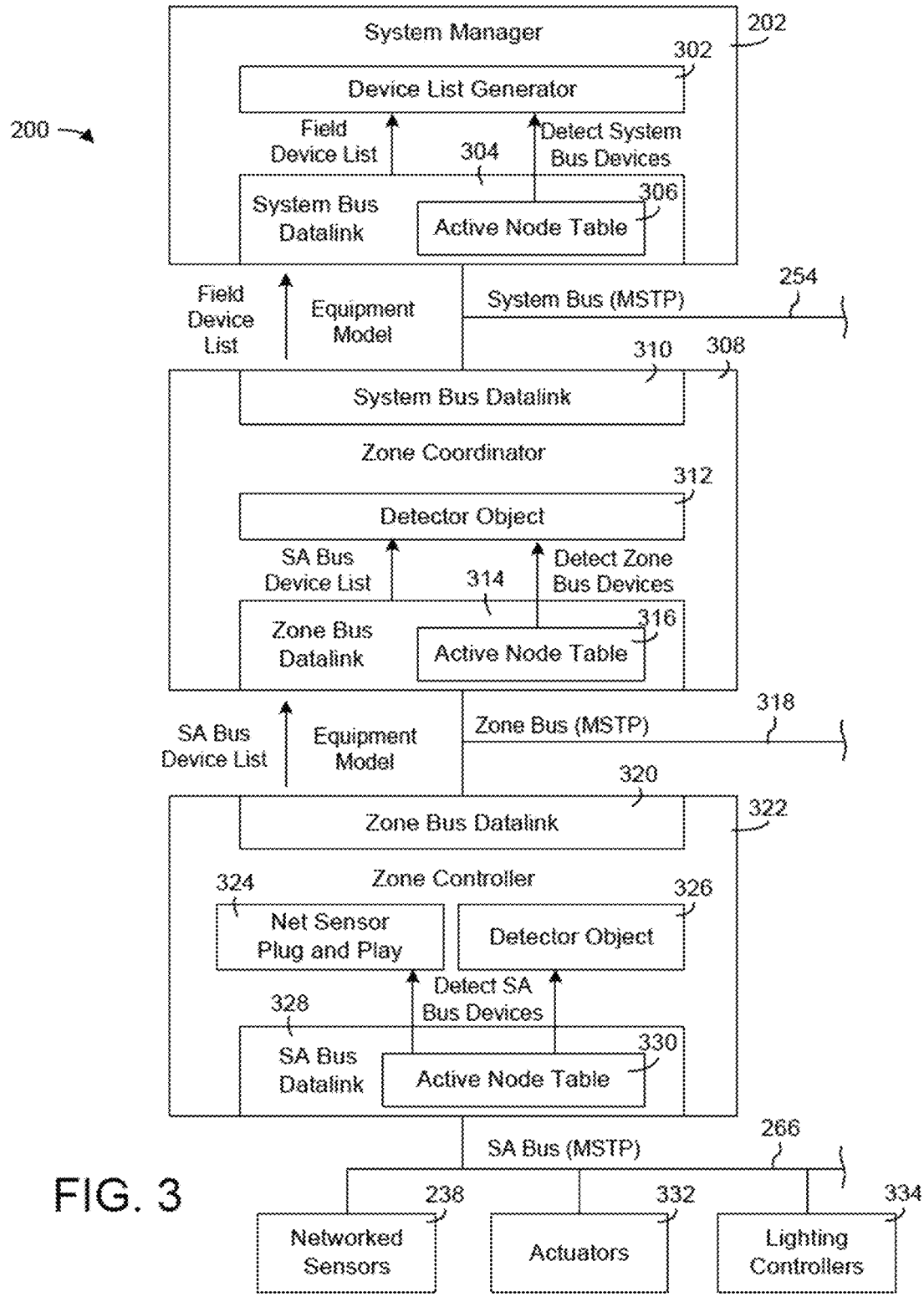
FIG. 3 is a block diagram illustrating a system manager, zone coordinator, and zone controller of the BMS of FIG. 2 in greater detail, according to some embodiments.

Referring now to FIG. 3, a block diagram illustrating a portion of BMS 200 in greater detail is shown, according to an exemplary embodiment. BMS 200 is shown to include system manager 202, a zone coordinator 308, and a zone controller 322. Zone coordinator 308 can be any of zone coordinators 206-210 or 218. Zone controller 322 can be any of zone controllers 224, 230, 232, 236, 248, or 250. Zone coordinator 308 can be connected with system manager via system bus 254. For example, system bus 254 is shown connecting a first system bus datalink 304 within system manager 202 with a second system bus datalink 310 within zone coordinator 308. Zone coordinator 308 can connected with zone controller 322 via a zone bus 318. For example, zone bus 318 is shown connecting a first zone bus datalink 314 within zone coordinator 308 with a second zone bus datalink 320 within zone controller 322. Zone bus 318 can be any of zone busses 256-260 or 264. Zone controller 322 is connected with networked sensors 238 and actuators 332 via a SA bus 266.

BMS 200 can automatically discover new equipment connected to any of system bus 254, zone bus 318, and SA bus 266. Advantageously, the equipment discovery can occur automatically (e.g., without user action) without requiring the equipment to be placed in discovery mode and without sending a discovery command to the equipment. In some embodiments, the automatic equipment discovery is based on active node tables for system bus 254, zone bus 318, and SA bus 266. Each active node table can provide status information for the devices communicating on a particular bus. For example, the active node table 306 for system bus 254 can indicate which MSTP devices are participating in the token ring used to exchange information via system bus 254. Active node table 306 can identify the devices communicating on system bus 254 by MAC address or other device identifier. Devices that do not participate in the token ring (e.g., MSTP slave devices) can be automatically discovered using a net sensor plug and play (described in greater detail below).

The active node table for each communications bus can be stored within one or more devices connected to the bus. For example, active node table 306 can be stored within system manager 202. In some embodiments, active node table 306 is part of a system bus datalink 304 (e.g., a MSTP datalink) used by system manager 202 to communicate via system bus 254. System manager 202 can subscribe to changes in value of active node table 306 and can receive a notification (e.g., from system bus datalink 304) when a change in active node table 306. In response to a notification that a change in active node table 306 has occurred, system manager 202 can read active node table 306 to detect and identify the devices connected to system bus 254.

In some embodiments, a device list generator 302 within system manager 202 generates a list of the devices connected to system bus 254 (i.e., a device list) based on active node table 306 and stores the device list within system manager 202. The device list generated by system manager 202 can include information about each device connected to system bus 254 (e.g., device type, device model, device ID, MAC address, device attributes, etc.). When a new device is detected on system bus 254, system manager 202 can automatically retrieve the equipment model from the device if the device stores its own equipment model. If the device does not store its own equipment model, system manager 202 can retrieve a list of point values provided by the device. System manager 202 can then use the equipment model and/or list of point values to present information about the connected system bus devices to a user.

The active node tables for each zone bus can be stored within the zone coordinator connected to the zone bus. For example, the active node table 316 for zone bus 318 can be stored within zone coordinator 308. In some embodiments, active node table 316 is part of a zone bus datalink 314 (e.g., a MSTP datalink) used by the zone coordinator 308 to communicate via zone bus 318. Zone coordinator 308 can subscribe to changes in value of active node table 316 and can receive a notification (e.g., from zone bus datalink 314) when a change in active node table 316 occurs. In response to a notification that a change to active node table 316 has occurred, zone coordinator 308 can read active node table 316 to identify the devices connected to zone bus 318.

In some embodiments, a detector object 312 of zone coordinator 308 generates a list of the devices communicating on zone bus 318 (i.e., a device list) based on active node table 316 and stores the device list within zone coordinator 308. Each zone coordinator in BMS 200 can generate a list of devices on the connected zone bus. The device list generated by each zone coordinator 308 can include information about each device connected to zone bus 318 (e.g., device type, device model, device ID, MAC address, device attributes, etc.). When a new device is detected on zone bus 318, the connected zone coordinator 308 can automatically retrieve the equipment model from the device if the device stores its own equipment model. If the device does not store its own equipment model, the connected zone coordinator 308 can retrieve a list of point values provided by the device.

Zone coordinator 308 can incorporate the new zone bus device into the zoning logic and can inform system manager 202 that a new zone bus device has been added. For example, zone coordinator 308 is shown providing a field device list to system manager 202. The field device list can include a list of devices connected to zone bus 318 and/or SA bus 266. System manager 202 can use the field device list and the list of system bus devices to generate a device tree including all of the devices in BMS 200. In some embodiments, zone coordinator 308 provides an equipment model for a connected zone bus device to system manager 202. System manager 202 can then use the equipment model and/or list of point values for the new zone bus device to present information about the new zone bus device to a user.

In some embodiments, the device list generated by each zone coordinator 308 indicates whether system manager 202 should communicate directly with the listed zone bus device (e.g., VAV RTU 222, VAV zone controller 224, etc.) or whether system manager 202 should communicate with the intermediate zone coordinator 308 on behalf of the zone bus device. In some embodiments, system manager 202 communicates directly with zone bus devices that provide their own equipment models, but communicates with the intermediate zone coordinator 308 for zone bus devices that do not provide their own equipment model. As discussed above, the equipment models for zone bus devices that do not provide their own equipment model can be generated by the connected zone coordinator 308 and stored within the zone coordinator 308. Accordingly, system manager 202 may communicate directly with the device that stores the equipment model for a connected zone bus device (i.e., the zone bus device itself or the connected zone coordinator 308).

The active node table 330 for SA bus 266 can be stored within zone controller 322. In some embodiments, active node table 330 is part of the SA bus datalink 328 (e.g., a MSTP datalink) used by zone controller 322 to communicate via SA bus 266. Zone controller 322 can subscribe to changes in value of the active node table 330 and can receive a notification (e.g., from SA bus datalink 328) when a change in active node table 330 occurs. In response to a notification that a change to active node table 330 has occurred, zone controller 322 can read active node table 330 to identify some or all of the devices connected to SA bus 266. In some embodiments, active node table 330 identifies only the SA bus devices participating in the token passing ring via SA bus 266 (e.g., MSTP master devices). Zone controller 322 can include an additional net sensor plug and play (NsPnP) 324 configured to detect SA bus devices that do not participate in the token passing ring (e.g., MSTP slave devices).

In some embodiments, NsPnP 324 is configured to actively search for devices connected to SA bus 266 (e.g., networked sensors 238, actuators 332, lighting controllers 334, etc.). For example, NsPnP 324 can send a "ping" to a preconfigured list of MSTP slave MAC addresses. For each SA bus device that is discovered (i.e. responds to the ping), NsPnP 324 can dynamically bring it online. NsPnP 324 can bring a device online by creating and storing an instance of a SA bus device object representing the discovered SA bus device. NsPnP 324 can automatically populate the SA bus device object with all child point objects needed to collect and store point data (e.g., sensor data) from the newly-discovered SA bus device. In some embodiments, NsPnP 324 automatically maps the child point objects of the SA bus device object to attributes of the equipment model for zone controller 322. Accordingly, the data points provided by the SA bus devices can be exposed to zone coordinator 308 and other devices in BMS 200 as attributes of the equipment model for zone controller 322.

In some embodiments, a detector object 326 of zone controller 322 generates a list of the devices connected to SA bus 266 (i.e., a device list) based on active node table 330 and stores the device list within zone controller 322. NsPnP 324 can update the device list to include any SA bus devices discovered by NsPnP 324. The device list generated by zone controller 322 can include information about each device connected to SA bus 266 (e.g., device type, device model, device ID, MAC address, device attributes, etc.). When a new device is detected on SA bus 266, zone controller 322 can automatically retrieve the equipment model from the device if the device stores its own equipment model. If the device does not store its own equipment model, zone controller 322 can retrieve a list of point values provided by the device.

Zone controller 322 can incorporate the new SA bus device into the zone control logic and can inform zone coordinator 308 that a new SA bus device has been added. Zone coordinator 308 can then inform system manager 202 that a new SA bus device has been added. For example, zone controller 322 is shown providing a SA device list to zone coordinator 308. The SA device list can include a list of devices connected to SA bus 266. Zone coordinator 308 can use the SA device list and the detected zone bus devices to generate the field device list provided to system manager 202. In some embodiments, zone controller 322 provides an equipment model for a connected SA bus device to zone coordinator 308, which can be forwarded to system manager 202. System manager 202 can then use the equipment model and/or list of point values for the new SA bus device to present information about the new SA bus device to a user. In some embodiments, data points provided by the SA bus device are shown as attributes of the zone controller 322 to which the SA bus device is connected.

Additional features and advantages of BMS 200, system manager 202, zone coordinator 308, and zone controller 322 are described in detail in U.S. patent application Ser. No. 15/179,894 filed Jun. 10, 2016, the entire disclosure of which is incorporated by reference herein.

PoE Adapter

Figure 4:
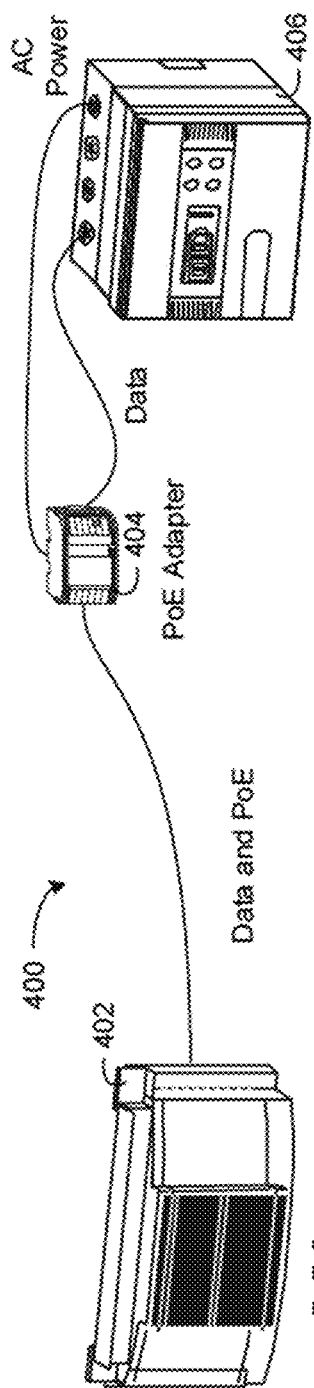
FIG. 4 is a block diagram of a PoE adapter for a building controller, the PoE adapter powering the building controller based on PoE received from a PoE source, according to some embodiments.

Referring now to FIG. 4, a building management system 400 including a PoE source 402, a PoE adapter 404, and a building controller 406 is shown. The system 400 can be a system of the building of FIG. 1 and/or implemented in the BMS 200 as described with reference to FIGS. 2-3. The system 400 can be used to power and facilitate communication among any number of networks and/or building controllers.

The PoE source 402 is configured to generate PoE and provide data over an Ethernet cable. The Ethernet cable may be a Category 3 Ethernet cable, a Category 5 Ethernet cable, a Category 5E Ethernet cable, and/or a Category 6 Ethernet cable. The Ethernet cable can include one or multiple twisted pairs configured to facilitate the transfer of information and/or PoE. In an embodiment, the PoE source 402 can be a network device (or a network of devices) and/or a device configured to provide PoE. For example, the PoE source 402 can be, or include, a PoE injector configured to transform battery or building power into PoE. Furthermore, the PoE source 402 can be a network switch, a router, and/or any other network device configured to perform PoE. In some embodiments, the network device includes a PoE injector. Furthermore, in some embodiments, the PoE source 402 is another building controller, e.g., any of the controllers described with reference to FIGS. 2-3. PoE and PoE sources are described in greater detail in U.S. patent application Ser. No. 15/956,914 filed Apr. 19, 2018.

The building controller 406, of the present disclosure, is configured to operate building equipment to control one or more environmental conditions of a building (e.g., temperature, humidity, lighting, air quality, etc.). Specifically, the building controller 406 includes one or more controller circuits configured to operate one or more building equipment of the building management system 400, wherein the controller circuit is powered via alternating current (AC) power. Furthermore, the building controller 406 can be configured to operate, and/or be a part of, access control systems, variable air volume (VAV) systems, surveillance systems, etc. The building controller 406 can be the same as or similar to the building controllers described with reference to FIGS. 2-3. The building controller 406 can be an Internet enabled controller, e.g., an Internet Protocol (IP) controller.

In an embodiment, the PoE adapter 404 can be an adapter faceplate configured to provide power to the building controller 406. The PoE adapter 404 is configured to convert the PoE, which is DC power, into AC power. Further, the PoE adapter 404 is configured to provide the AC power to the building controller 406, wherein the building controller 406 can be configured to power itself based on the received AC power from the PoE adapter 404. Furthermore, the PoE adapter 404 provides data communications to the building controller 406. In some embodiments, the data communications are sensor data, operational commands, etc. The building controller 406 can be configured to operate based on the data. For example, the building controller 406 can be configured to determine and/or perform one or more operational decision for building equipment to control one or more environmental conditions.

The Ethernet cable connecting the PoE source 402 and the PoE adapter 404 can include eight wires, i.e., four twisted pairs. Six of the wires (three of the twisted pairs) may carry data. The twisted pairs carrying the data communication may be configured for 10/100/1000 Mega bits per second (Mbps). Two of the wires (one of the twisted pairs) can carry PoE which is at 52 VDC, 0.4 Amp. One Ethernet cable between the PoE adapter 404 can facilitate data communications between the PoE source 402 and the building controller 406. The PoE adapter 404 may pass through the six wires carrying data to the building controller 406. Furthermore, the PoE adapter 404 converts the DC power of the PoE to AC power and deliver the AC power to power terminals of the building controller 406, wherein the generated AC power is of 24 VAC at 0.4 A.

Figure 5:
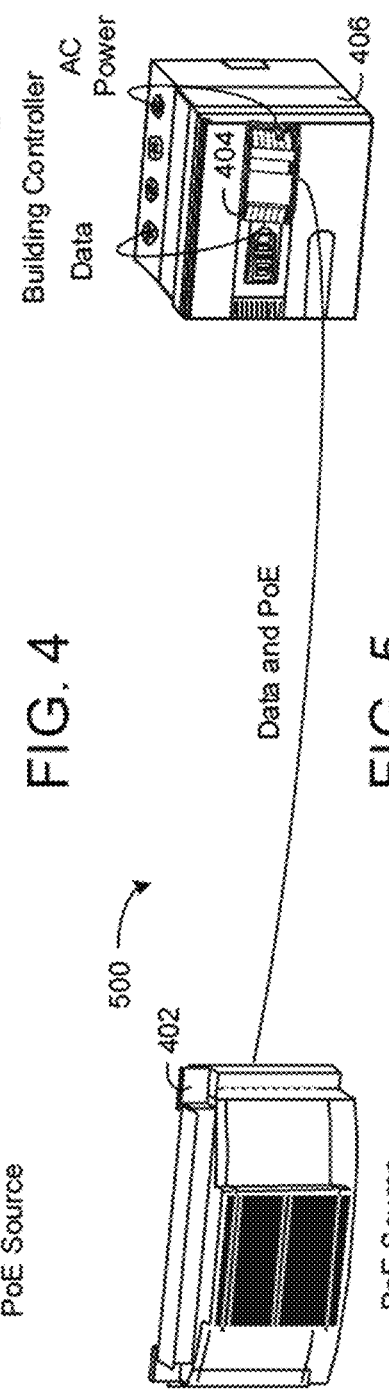
FIG. 5 is a block diagram of the PoE adapter of FIG. 4 mounted on the building controller of FIG. 4, according to some embodiments.
Figure 6:
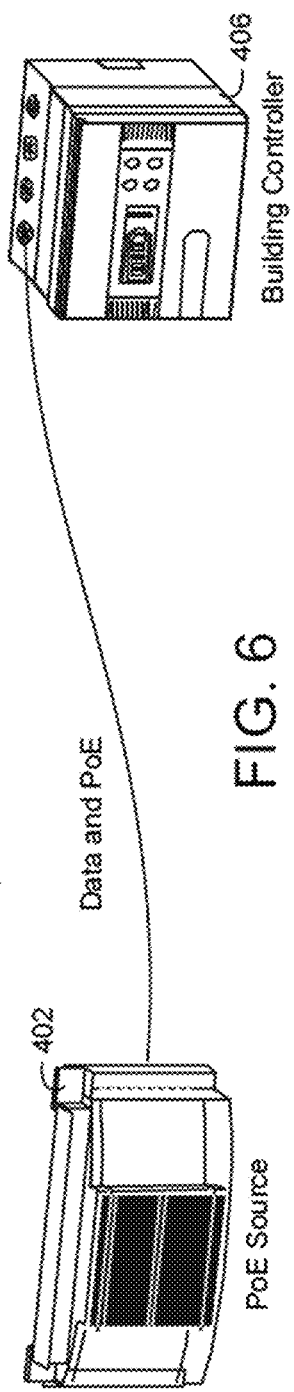
FIG. 6 is a block diagram of the building controller and the PoE source of FIG. 4 wherein the PoE adapter is incorporated within the building controller, according to some embodiments.

Referring now to FIG. 5, the PoE adapter 404 is shown to be mounted to the building controller 406. Mounting the PoE adapter 404 to the building controller 406 may reduce the space used where the PoE adapter 404 is separated from the building controller 406 (e.g., FIG. 4). In some embodiments, the building controller 406 is structured so that the PoE adapter 404 can be mounted onto the building controller 406 via one or more snaps, screws, etc. Referring now to FIG. 6, the building controller 406 is shown to include a PoE adapter, e.g., the PoE adapter 404. The PoE adapter 404 can be housed within an enclosure of the building controller 406 such that the building controller 406 may be ready to be powered via PoE upon deployment.

Figure 7A:
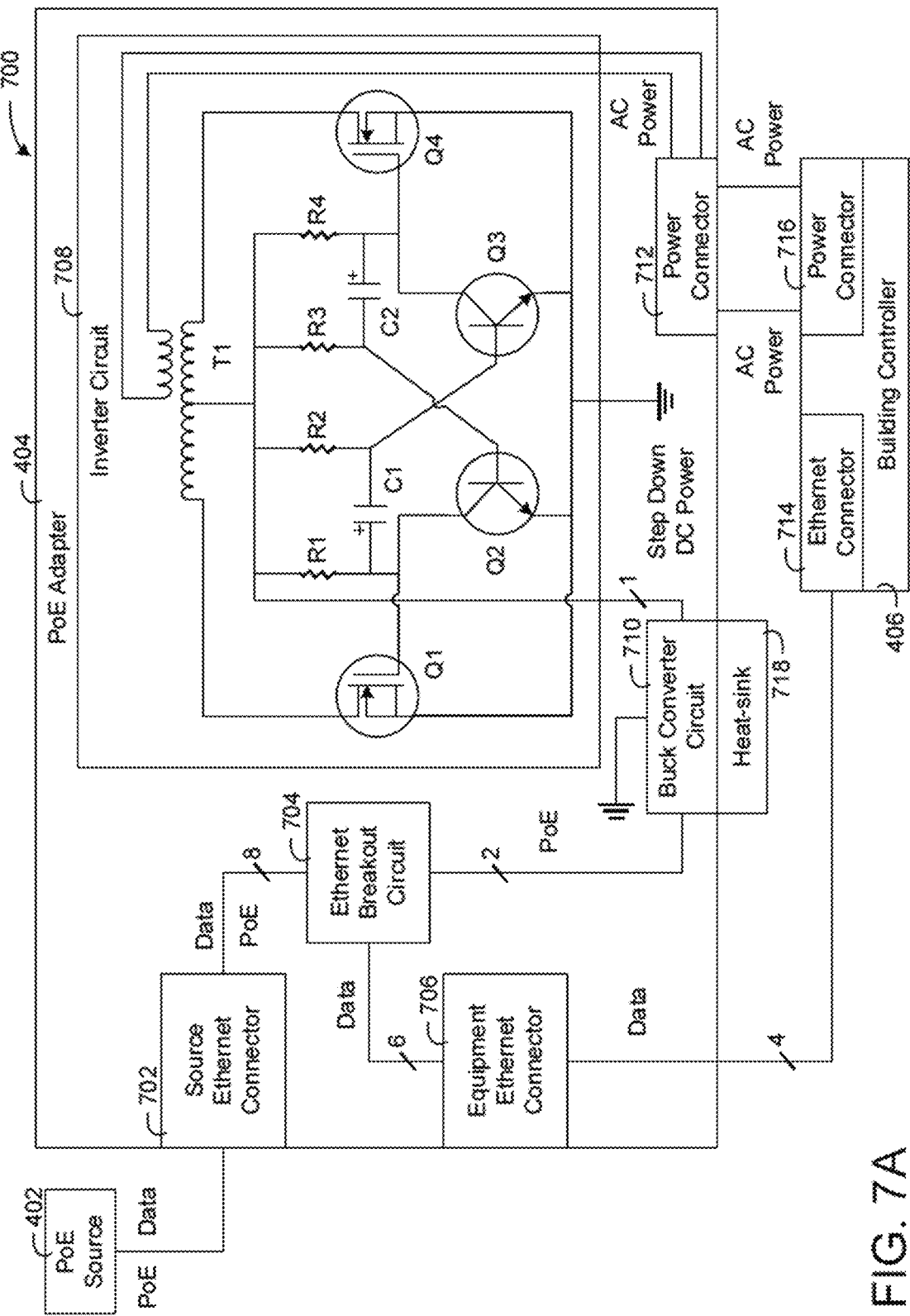
FIG. 7A is a block diagram of the PoE adapter, the building controller, and the PoE source of FIGS. 4-6 in greater detail, according to some embodiments.

Referring now to FIG. 7A, a system 700 is shown illustrating the PoE source 402, the PoE adapter 404, and the building controller 406 in greater detail, according to one embodiment. The PoE adapter 404 includes a source Ethernet connector 702 and an equipment Ethernet connector 706. The source Ethernet connector 702 and the equipment Ethernet connector 706 can be an Ethernet receiving connector (e.g., a female connector) configured to receive an Ethernet cable and make electrical contact with the wires of the Ethernet cable. The source Ethernet connector 702 can receive PoE from the PoE source 402 and facilitate data communications between the building controller 406 and the PoE source 402.

The connections of the Ethernet cable connecting the PoE source to the source Ethernet connector 702 can be split via an Ethernet breakout circuit 704 of the PoE adapter 404. The Ethernet breakout circuit 704 can connect one or more wires of the Ethernet associated with PoE to a buck converter circuit 710 of the PoE adapter 404 while one or more wires associated with data communication can be connected to the equipment Ethernet connector 706. The equipment Ethernet connector 706 can in turn connect the data connection to an Ethernet connector 714 of the building controller 406 which may be the same as or similar to the source Ethernet connector 702 and the equipment Ethernet connector 706.

The connections carrying the PoE is connected to the buck converter circuit 710 via the Ethernet breakout circuit 704. The buck converter circuit 710 is configured to step down the DC power of the PoE. More specifically, the buck converter circuit 710 is configured to step down 52 V DC at 0.4 A to 24 V DC at 0.8 A. The hot connection and a common connection of the buck converter circuit 710 can be connected to an inverter circuit 708.

The inverter circuit 708 is configured to transform the DC power received from the buck converter circuit 710 to AC power. More specifically, the inverter circuit 708 is configured to transform the 24 V DC at 0.8 A of the buck converter circuit 710 to 24 VAC at 0.4 A. The hot wire of the inverter circuit 708 is connected to a hot terminal of a power connector 712 while a ground terminal of the power connector 712 is grounded with the inverter circuit 708 and the buck converter circuit 710.

In an embodiment, the buck converter circuit 710 generates heat as a byproduct of stepping down the DC PoE. To facilitate heat transfer away from the PoE adapter 404, the buck converter circuit 710 is provided with a heat-sink 718. The heat-sink 718 may be in contact with, or in close proximity to, the buck converter circuit 710. In some embodiments, the heat-sink 718 comes into contact with the buck converter circuit 710 via thermal grease. The heat-sink, 718 can include one or multiple fins which increase the surface area of the heat-sink 718 and increase convection.

The inverter circuit 708 includes transistors Q1, Q2, Q3, and Q4, in some embodiments. The transistors Q1 and Q4 can be field effect transistors (FETs). The transistors Q2 and Q3 can be bipolar junction transistors. In some embodiments, transistors Q1 and Q4 can be IRF630 transistors while the transistors Q2 and Q3 can be 2N2222 transistors. Inverter circuit 708 includes resistors R1, R2, R3, and R4. The resistors may be metal oxide resistors, cermet film resistors, fusible resistors, and/or any other type of resistor. The resistors R1, R2, R3, and R4 can be 680Ω, 12Ω, 12Ω, and 680Ω respectively. The inverter circuit 708 includes capacitors C1 and C2. The capacitors C1 and C2 are shown to be bipolar capacitors. The capacitors C1 and C2 can be ceramic capacitors, film and paper capacitors, aluminum, tantalum, and niobium electrolytic capacitors, etc. The capacitors C1 and C2 may have values of 2.2 µF. The inverter circuit 708 further includes a transformer, T1.

Figure 7B:
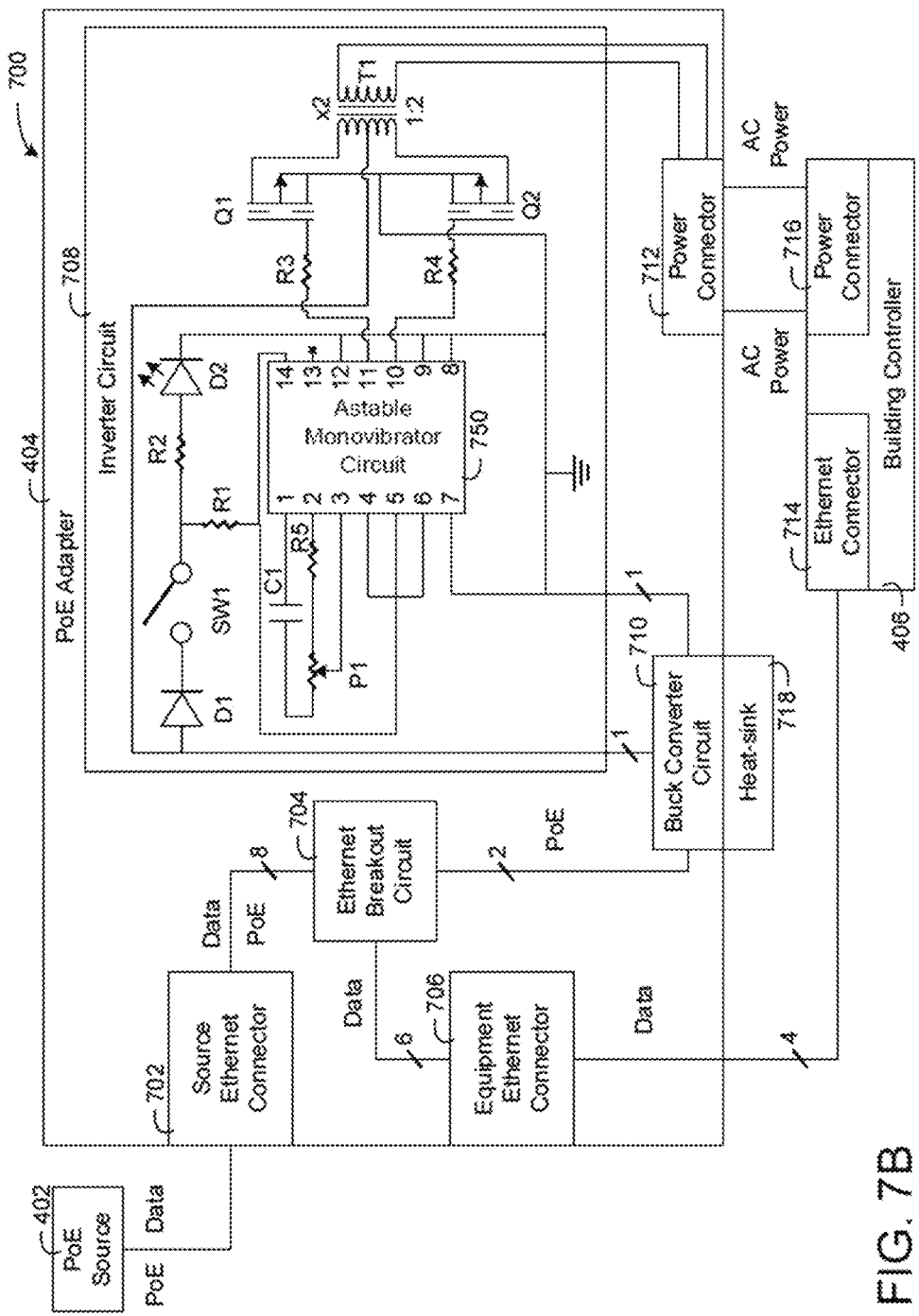
FIG. 7B is another block diagram of the PoE adapter including an a stable monovibrator circuit, according to some embodiments.

Referring now to FIG. 7B, the PoE adapter 404 is shown where the inverter circuit 708 includes an a stable monovibrator circuit 750, according to an exemplary embodiment. The a stable monovibrator 750 can be an integrated circuit. The a stable monobibrator circuit 750 can be configured to generate a clock signal used to generate the AC power supplied to the building controller 406. The resistors R1-R5, the capacitor C1, and the transistors Q1 and Q2 can be resistors similar to the resistors, capacitors, and transistors discussed with reference to FIG. 7A. The transistors Q1 and Q2 may be IRF630 transistors while the a stable monovibrator circuit 750 may be a 4047 circuit. P1 may be a potentiometer. The transformer may have a 1:2 ratio in its winding. Diode D1 can be a PIN diode, a PN junction diode, and/or any other type of diode. Diode D2 may be a light emitting diode that illuminates to indicate to an end user that PoE is received by the PoE adapter 404. The voltage provided to the buck converter circuit 710 may be 52 VDC at 0.4 A. The voltage generated by the buck converter circuit 710 may be 12 VDC at 1.73 A while the voltage generated by the inverter circuit 708 may be 24 VAC at 0.8 A.

Figure 8:
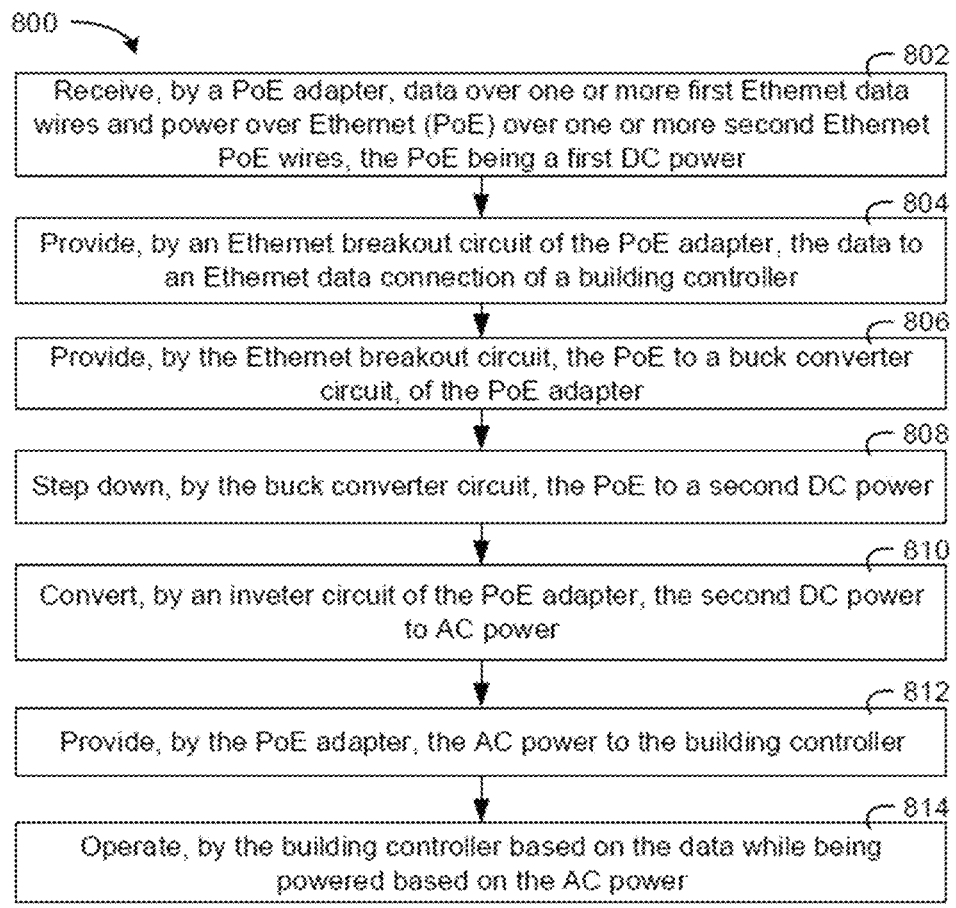
FIG. 8 is a flow diagram of a process of powering and communicating with the building controller of FIG. 4 with the PoE adapter of FIG. 4, the process being performed by the building controller and the PoE adapter, according to some embodiments.

Referring now to FIG. 8, a process 800 of powering the building controller 406 via PoE with the PoE adapter 404 is shown, according to an exemplary embodiment. In some embodiments, the PoE source 402, the PoE adapter 404, and/or the building controller 406 as described with reference to FIGS. 4-7 are configured to perform some and/or all of the steps of the process 800.

In step 802, the PoE adapter can receive data and/or PoE via one or more wires of an Ethernet cable. More specifically, the PoE adapter can receive data signals via one or more data wires of the Ethernet cable and PoE via one or more second Ethernet PoE wires. The data can be data communicated from the building controller 406 to the PoE source 402 and/or from the PoE source 402 to the building controller 406. The PoE may be PoE generated by the PoE source 402. In some embodiments, the PoE is DC power.

In step 804, the Ethernet breakout circuit 704 of the PoE adapter 404 can provide data communications from the PoE source 402 to the building controller 406. Similarly, the Ethernet breakout circuit 704 can provide data communications from the building controller 406 to the PoE source 402. For example, electrical connections for the data communication can be made between the PoE source 402 and the building controller 406 through one or more Ethernet cables from the PoE source 402, the Ethernet breakout circuit 704, and one or more Ethernet cables between the equipment Ethernet connector 706 and the Ethernet connector 714. In step 806, the Ethernet breakout circuit 704 can provide PoE to the buck converter circuit 710. The Ethernet breakout circuit 704 can make electrical connections for PoE between the source Ethernet connector 702 and the buck converter circuit 710.

In step 808, the buck converter circuit 710 can step down the PoE received from the Ethernet breakout circuit 704 from a first DC power to a second DC power. More specifically, the buck converter circuit 710 can reduce a received PoE voltage. In step 810, the inverter circuit 708 can be configured to generate AC power for powering the building controller 406 based on the second DC power. In step 812, the PoE adapter 404 can provide the building controller 406 with the AC power generated in the step 810. The AC power can be provided via one or more wires (e.g., a hot wire and a common wire) wired between the power connector 712 of the PoE adapter 404 and the power connector 716 of the building controller 406.

In step 814, the building controller 406 can operate based on the data communicated via the Ethernet while being powered based on the AC power generated in the step 810. In some embodiments, while powered on the AC power, the building controller 406 receives the data which may be sensor data, actuator data, control setting data, etc. can perform one or more control operations to control building equipment to affect an environmental condition of a building based on the data.

Figure 9:
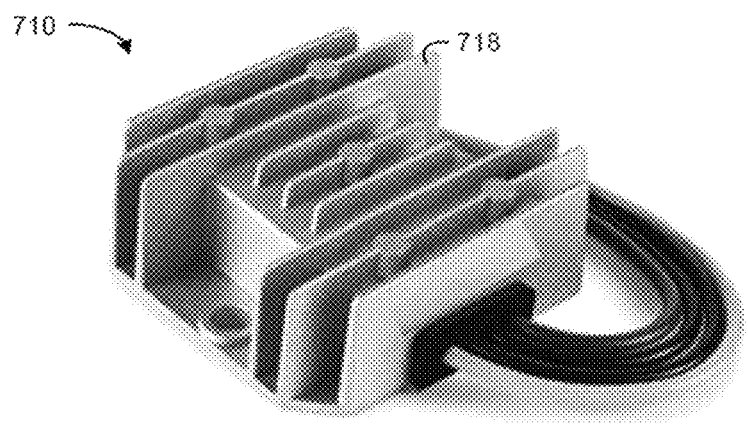
FIG. 9 is a perspective schematic drawing of a buck converter of the PoE adapter of FIG. 4 with a heat-sink, according to some embodiments.

Referring now to FIG. 9, the buck converter circuit 710 is shown in greater detail, according to an exemplary embodiment. The buck converter circuit 710 is shown with the heat-sink 718. The buck converter circuit 710 can be configured to receive an input between 48-54 VDC at 0.4 A and can be configured to generate a DC voltage used by the inverter circuit 708 to generate power, 24 VAC at 0.625 A (e.g., 15 W), for the building controller 406. In some embodiments, the input voltage to the buck converter circuit 710, the PoE, is 12 V DC. The buck converter circuit 710 can be configured to step down the voltage and provided the stepped down voltage to the inverter circuit 708 while cooling for the transfer of energy resulting from the conversion through the heat-sink 718. The stepped down power can be used by the inverter circuit 708 to generate 12 VAC which, when transferred through the transformer T1 of the inverter circuit 708, results in 24 VAC for powering the building controller 406. In some embodiments, rather than, or in addition to, including a buck converter circuit 710 to step down the voltage, the PoE adapter 404 utilizes a linear regulator. Together, the buck converter circuit 710 and the inverter circuit 708 can be configured to convert 48 VDC (the PoE) to 24 VAC.

Figure 10:
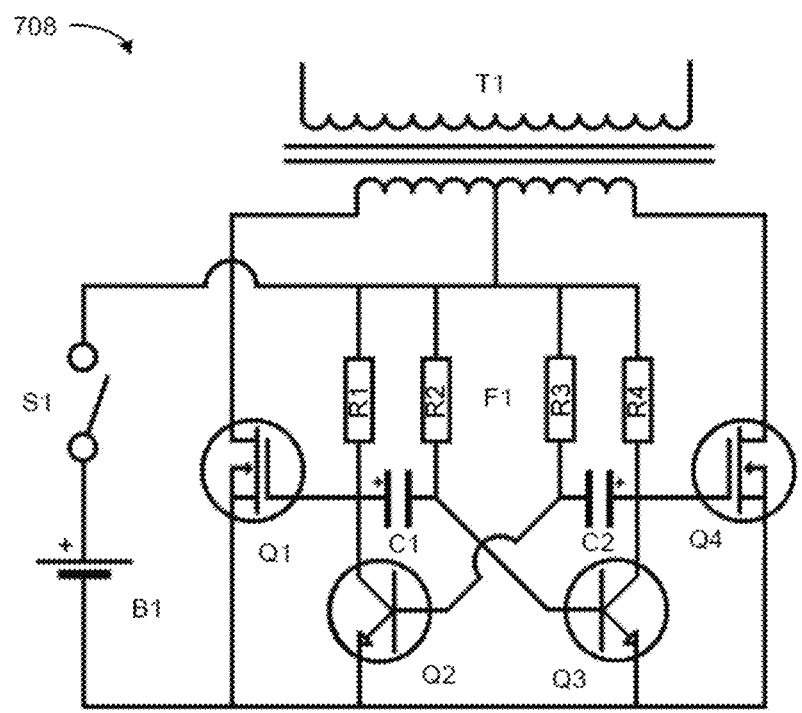
FIG. 10 is a schematic circuit diagram of an inverter of the PoE adapter of FIG. 4, according to some embodiment.

Referring now to FIG. 10, a circuit diagram of the inverter circuit 708 is shown, according to an exemplary embodiment. The transistors Q1-Q4 of FIG. 10 can be the same as, or similar to, the transistors Q1-Q4 of FIG. 7A. Similarly, the resistors R1-R4 of FIG. 10 can be the same as or similar to the resistors R1-R4 of FIG. 7A. Furthermore, the capacitors C1 and C2 of FIG. 7A can be the same as or similar to the capacitors C1 and C2 of FIG. 10. The transformer T1 of FIG. 10 can be the same as or similar to the transformer T1 of FIG. 7A. FIG. 10 includes a switch Si and a battery B1. The battery B1 can represent the voltage provided by the buck converter circuit 710 stepped down from the PoE received from the PoE source 402. The switch Si can enable or disable the inverter circuit 708.

The battery B1 may be a 12 V at 7 A maximum power source. The resistors R1 and R4 may be 680Ω. Furthermore the resistors R2 and R3 may be 12 KΩ. The transistors Q1 and Q4 can be IRF630 transistors while the transistors A2 and A3 can be 2N2222 transistors. The capacitors C1 and C2 can be 2.2 µF. The transistors Q2 and Q3, the capacitors C1-C2, and the resistor R1-R4 can form an a stable monovibrator circuit with a frequency F1, e.g., 55 Hz. The transformer T1 can be a 110 V or 230 VAC transformer. In some embodiments, the a stable monovibrator circuit is formed with multiple discrete components and/or a single, or multiple, integrated circuits.

Figure 11:
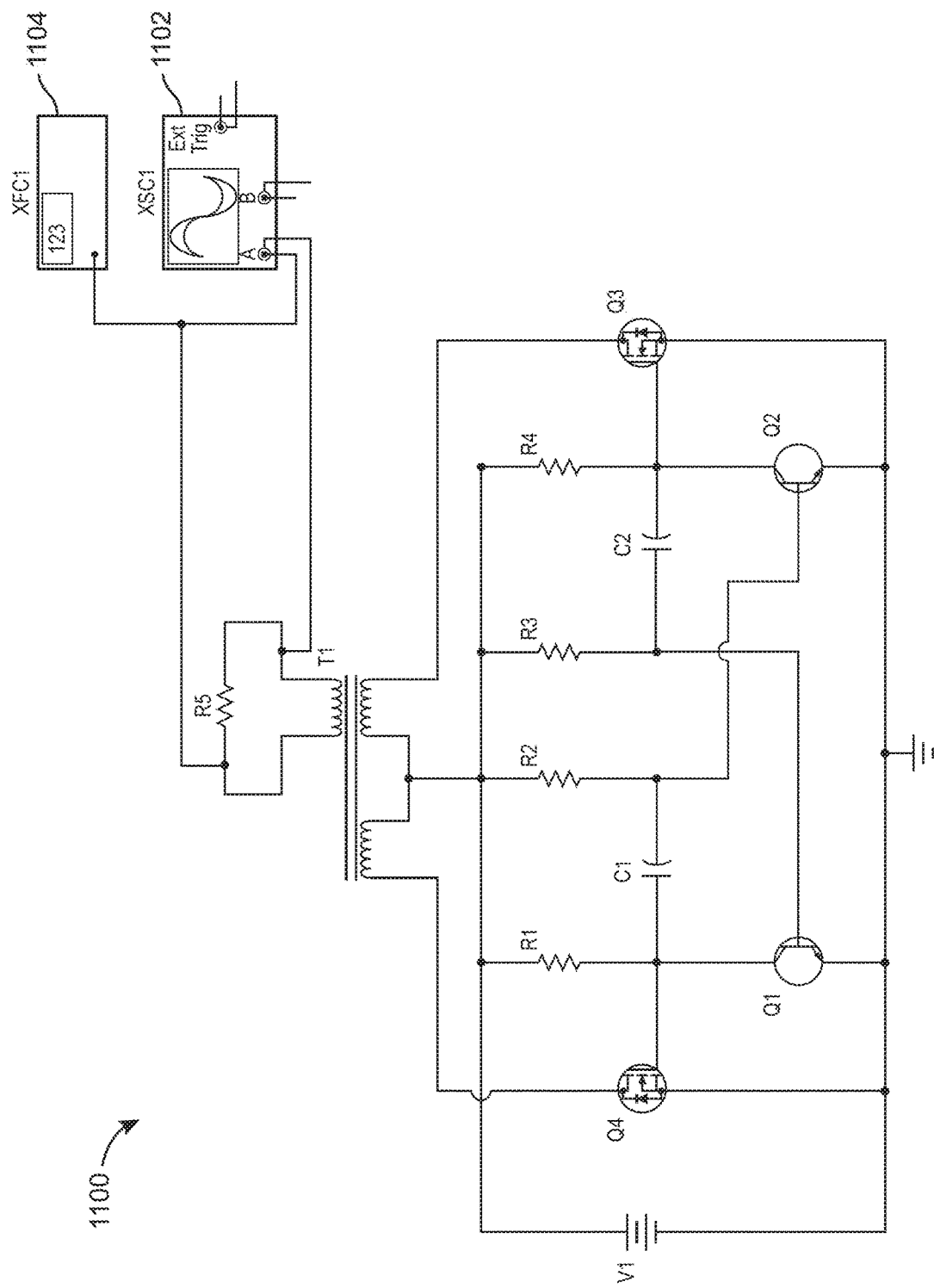
FIG. 11 is a diagram of a circuit simulation of the inverter of FIG. 10 including an oscilloscope tool and a frequency counting tool, according to some embodiment.

Referring now to FIG. 11, a circuit simulation 1100 of the inverter circuit 708 is shown, according to an exemplary embodiment. The circuit simulation 1100 can be the same as or similar to the inverter circuit 708 depicted in FIG. 7A. In some embodiments, the inverter circuit 708 is the circuit represented by the circuit simulation 1100. The resistors R1-R4, the capacitors C1-C2, the transformer T1, and the transistors Q1-Q4 can be the same as or similar to the resistors, capacitors, and transistors described in FIG. 7A and FIG. 10. The voltage source V1 can be a 12 V DC source (e.g., the output of the buck converter circuit 710. The transistors Q1 and Q2 can be 2N222A transistors while the transistors Q4 and Q3 may be IRF540 transistors. The resistors R1, R2, R3, and R4 can be 1050Ω, 26600Ω, 26000Ω, and 1050Ω respectively. The capacitors C1 and C2 can be 47 µF while the transformer T1 can have a winding ratio of 10:5:5.

In the simulation 1100, an oscilloscope tool 1102 can be configured to measure a voltage across a winding of the transformer T1 connected via a resistor, R5. The resistor R5 may be a 1Ω resistor. Similarly, a frequency counter can be configured to measure frequency of the signal of the same winding. The results of the simulation measurements by the oscilloscope tool 1102 is shown in FIG. 13 while the results of the simulation measurements by the frequency counting tool 1104 is shown in FIG. 12.

Figure 12:
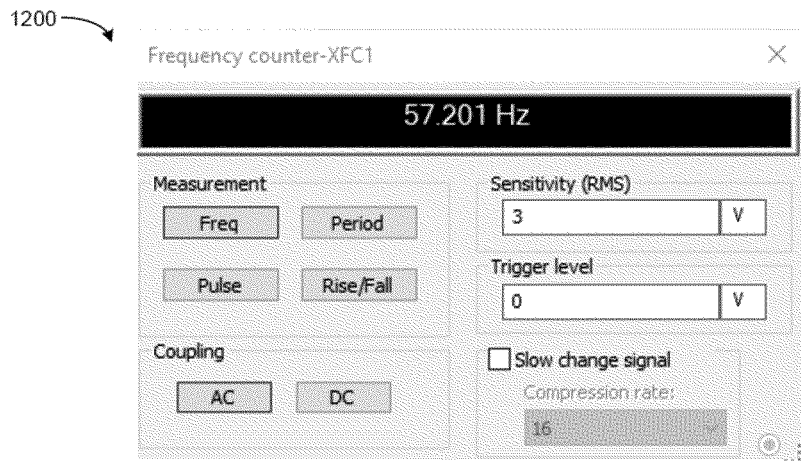
FIG. 12 is a simulation result screen of the frequency counting tool of FIG. 11 when the circuit simulation of FIG. 11 is run, according to some embodiments.

Referring now to FIG. 12, measurement results of the frequency counting tool 1104 of the simulation of FIG. 11 is shown, according to an exemplary embodiment. The results are shown in a window 1200 indicating that the AC power generated by the inverter simulation of FIG. 11 is at 57.201 Hz. This indicates the performance of inverter, where the nominal frequency may be 60 Hz for powering the building controller 406.

Figure 13:
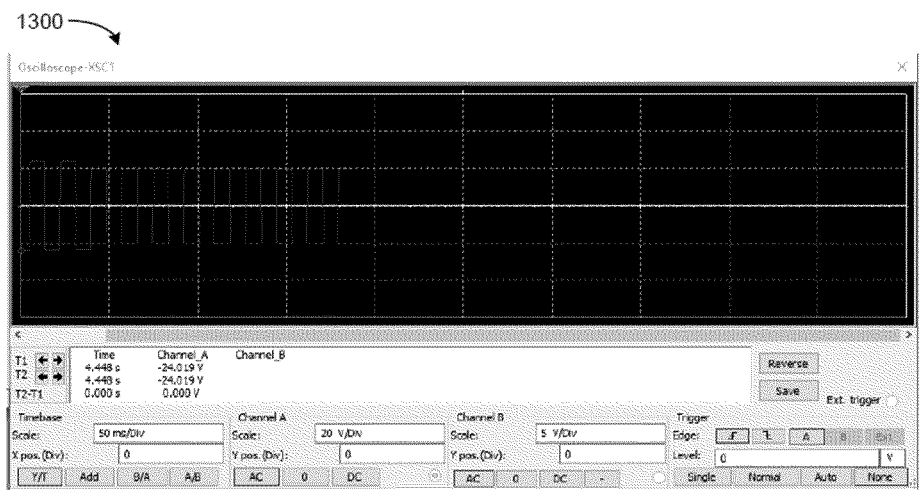
FIG. 13 is a simulation result screen of the oscilloscope tool of FIG. 11 when the circuit simulation of FIG. 11 is run, according to some embodiments.

Referring now to FIG. 13, measurement results of the oscilloscope tool 1102 of the simulation of FIG. 11 is shown, according to an exemplary embodiment. The results are shown in a window 1300 indicating a waveform of the AC power generated by the inverter simulation of FIG. 11.

Figure 14:
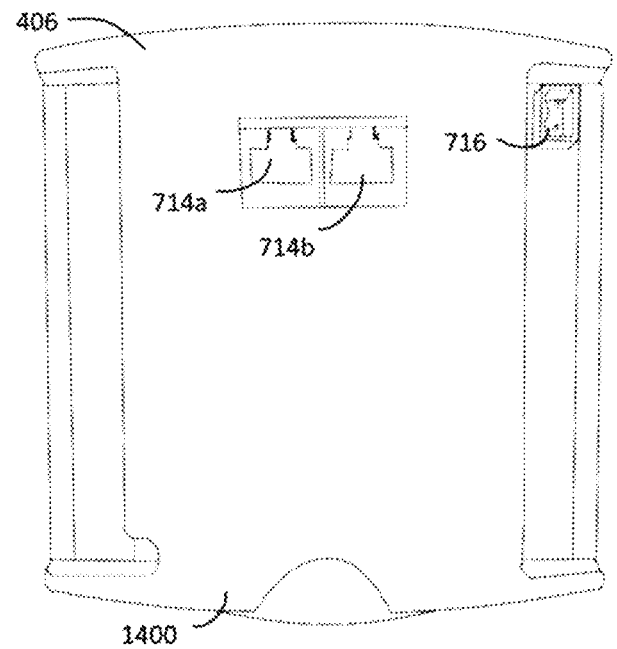
FIG. 14 is a perspective schematic drawing of the building controller of FIGS. 4-6 including a faceplate, according to some embodiments.

Referring now to FIG. 14, a schematic drawing of the building controller 406 is shown, according to an exemplary embodiment. The building controller 406 is shown to include a cover-plate 1400. The cover-plate 1400 may include areas exposing connections of the building controller 406. For example, the building controller 406 includes two Ethernet ports 714a and 714b which may be the same as, or similar to, the Ethernet connector 714. The cover-plate 1400 further includes an open area to expose the power connector 716. The cover-plate 1400 can be configured to snap and/or connect to a body of the building controller 406, the body illustrated in greater detail in FIG. 15. In some embodiments, the cover-plate 1400 is connected via one or more screws, snaps, clips, etc. The enclosure of the building controller 406 can be made out of plastic, carbon fiber, aluminum, stainless steel, etc.

Figure 15:
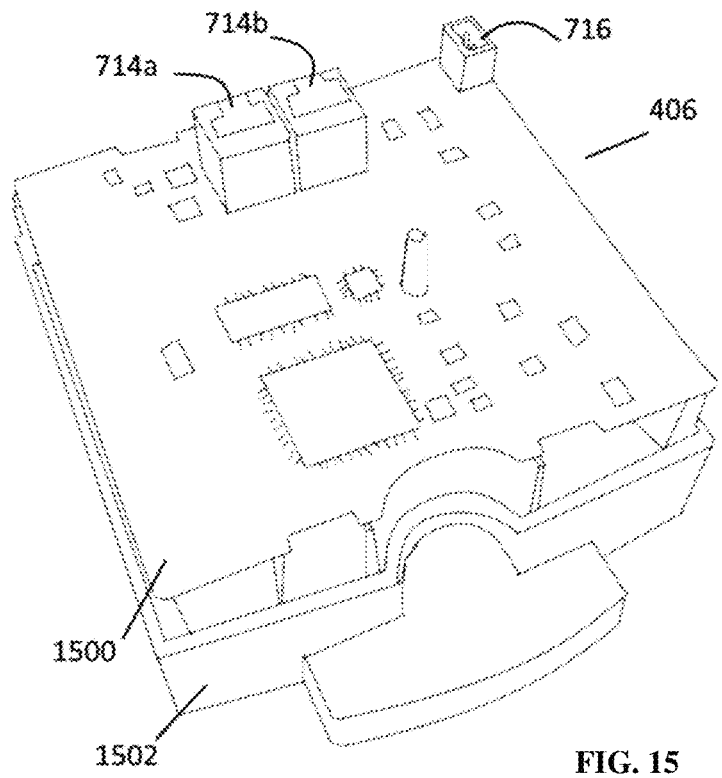
FIG. 15 is a perspective schematic drawing of the building controller of FIGS. 4-6 with the faceplate of FIG. 14 removed, the building controller including an enclosure body and a circuit board, according to some embodiments.

Referring now to FIG. 15, a schematic drawing of the building controller 406 with the cover-plate 1400 removed is shown, according to an exemplary embodiment. With the cover-plate 1400 removed, the circuit board 1500 of the building controller 406 is exposed, the circuit board 1500 including one or more processing circuits configured to facilitate data communications via the Ethernet ports 714a and/or 714b and/or control one or more building equipment. Furthermore, the circuit board 1500 includes the power connector 716 which can receive power for powering the circuit board 1500. FIG. 15 further illustrates an enclosure body 1502. The enclosure body 1502 can be configured to connect with the cover-plate 1400 (also referred as "enclosure faceplate") such that the cover-plate 1400 can be attached and/or removed from the enclosure body 1502.

Figure 16:
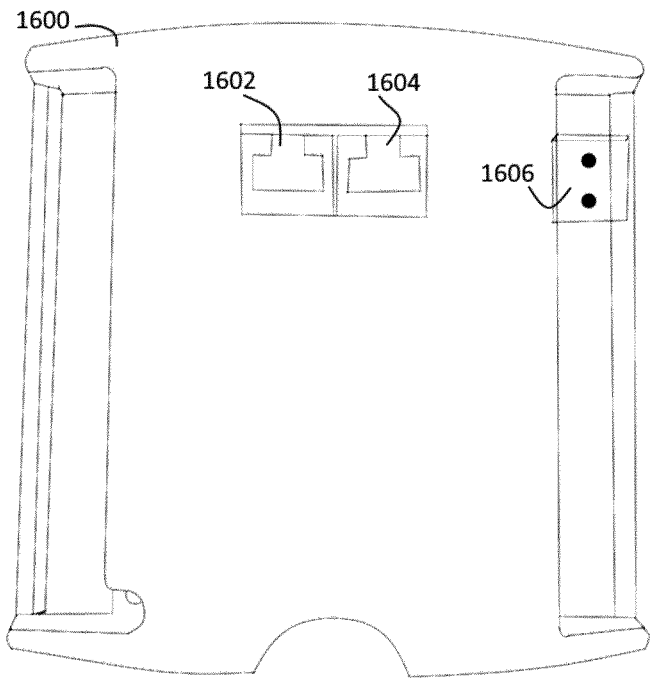
FIG. 16 is a perspective schematic drawing of a front side of a PoE adapter faceplate for the building controller of FIGS. 4-6, according to some embodiments.

Referring now to FIG. 16, a PoE adapter faceplate 1600 for the building controller 406 is shown, according to an exemplary embodiment. The PoE adapter faceplate 1600 may be similar to the cover-plate 1400 as described with reference to FIGS. 14-15, and can be attached and/or removed from the enclosure body 1502. However, the PoE adapter faceplate 1600 can include the PoE adapter 404/ adapter circuit(s) mounted thereon as described with reference to FIG. 7A for powering the building controller 406 via PoE. The PoE adapter faceplate 1600 can be structured similarly to the cover-plate 1400 such that, to convert a non-PoE building controller into a PoE building controller, a technician may remove the cover-plate 1400 from the enclosure body 1502 and replace the cover-plate 1400 with the PoE adapter faceplate 1600. The adapter faceplate 1600 is enabled to be detachably coupled to the enclosure body 1502 of the building controller.

The PoE adapter faceplate 1600 is shown to include Ethernet connectors 1602 and/or 1604. The Ethernet connectors 1602 and 1604 may in turn connect, directly or indirectly (e.g., through the PoE adapter 404) to the Ethernet ports 714a and 714b. Furthermore, the PoE adapter faceplate 1600 includes a power connector 1606 for connecting the AC power generated by the PoE adapter faceplate 1600 from the PoE to the power connector 716.

Figure 17:
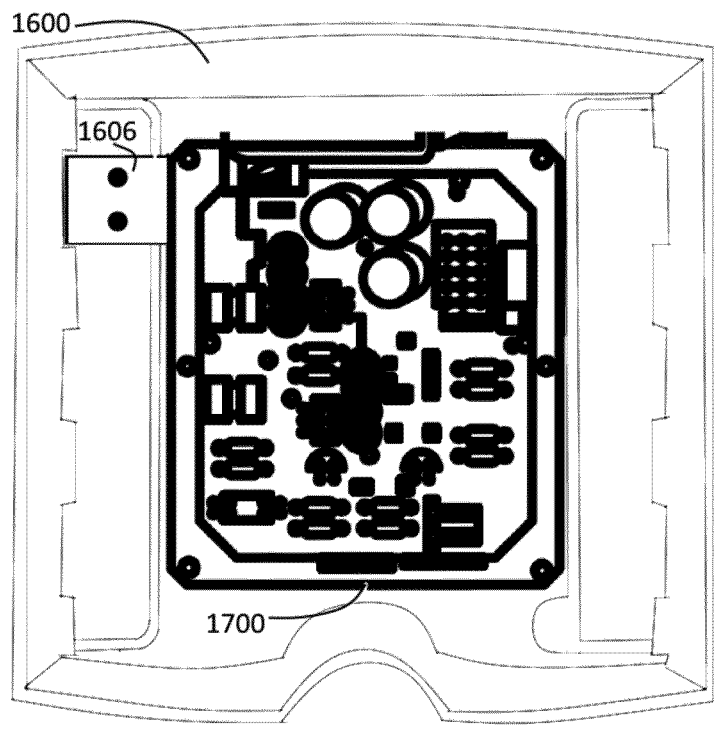
FIG. 17 is a perspective schematic drawing of a back side of the PoE adapter faceplate of FIG. 16, according to some embodiments.

Referring now to FIG. 17, the PoE adapter faceplate 1600 is shown from an upside down view exposing a circuit board 1700, according to an exemplary embodiment. The circuit board 1700 can be PoE adapter 404 and can include the Ethernet breakout circuit 704, buck converter circuit 710, the heat-sink 718, and/or the inverter circuit 708. The circuit board 1700 can be connected to the PoE adapter faceplate 1600 via one or more snaps, screws, clips, and/or any other connector.

Figure 18:
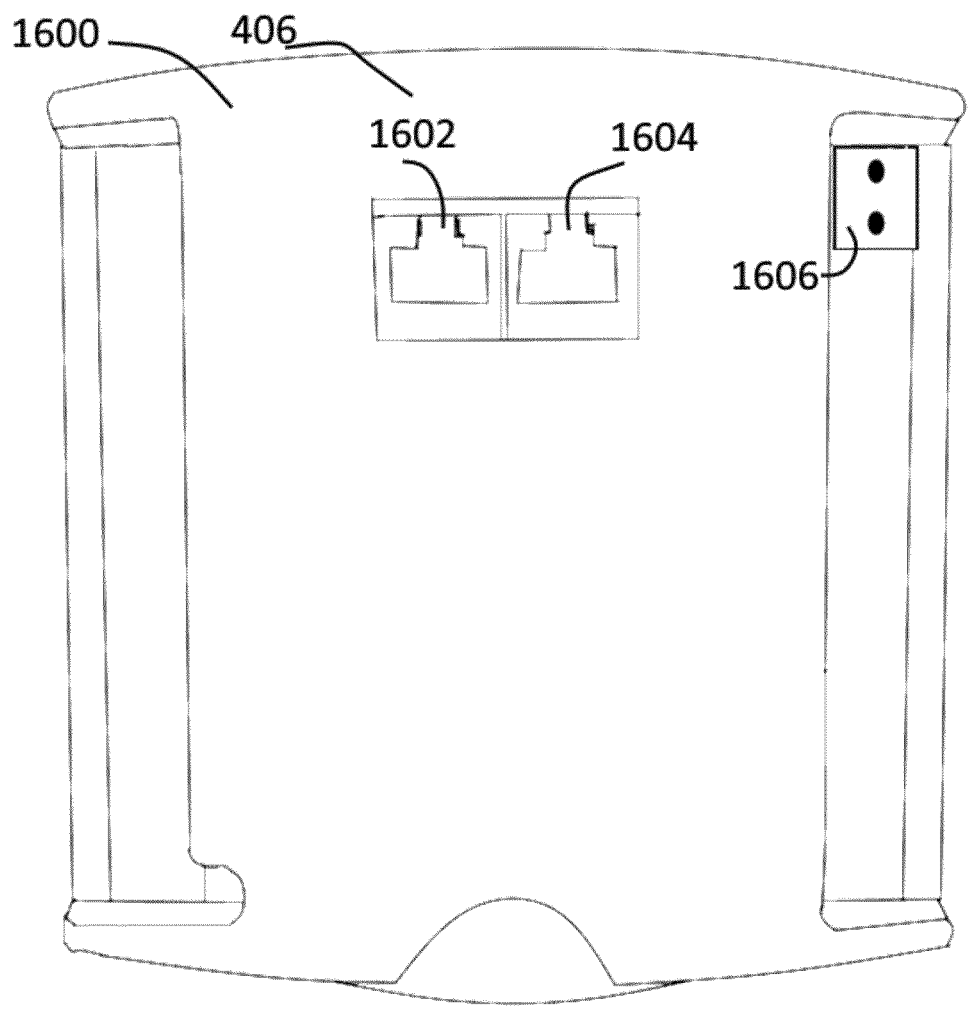
FIG. 18 is a perspective schematic drawing of the PoE adapter faceplate of FIG. 16 connected to the building controller described with reference to FIGS. 4-6, according to some embodiments.

Referring now to FIG. 18, the PoE adapter faceplate 1600 is shown connected to the building controller 406, wherein the adapter faceplate 1600 is detachably connected to the enclosure body of the building controller 406. The power connector 1606 is shown to connect with the power connector 716 providing AC power generated by the PoE adapter faceplate 1600 to the building controller 406. Furthermore, the Ethernet connectors 1602 and 1604 of the PoE adapter faceplate 1600 are shown covering the Ethernet ports 714a and 714b of the building controller 406. One or more connections between the Ethernet connectors 1602 and 1604 and the Ethernet ports 714a and 714 can be made by the PoE adapter faceplate 1600 to facilitate data communications.

In some embodiments, the PoE adapter faceplate 1600 is structured similarly to the cover-plate 1400 (also referred as enclosure faceplate). For example, the PoE adapter faceplate 1600 may have a width and length that are the same as the cover-plate 1400. However, in some embodiments, the PoE adapter faceplate 1600 has an extended depth in order to include the circuit board 1700.

Figure 19:
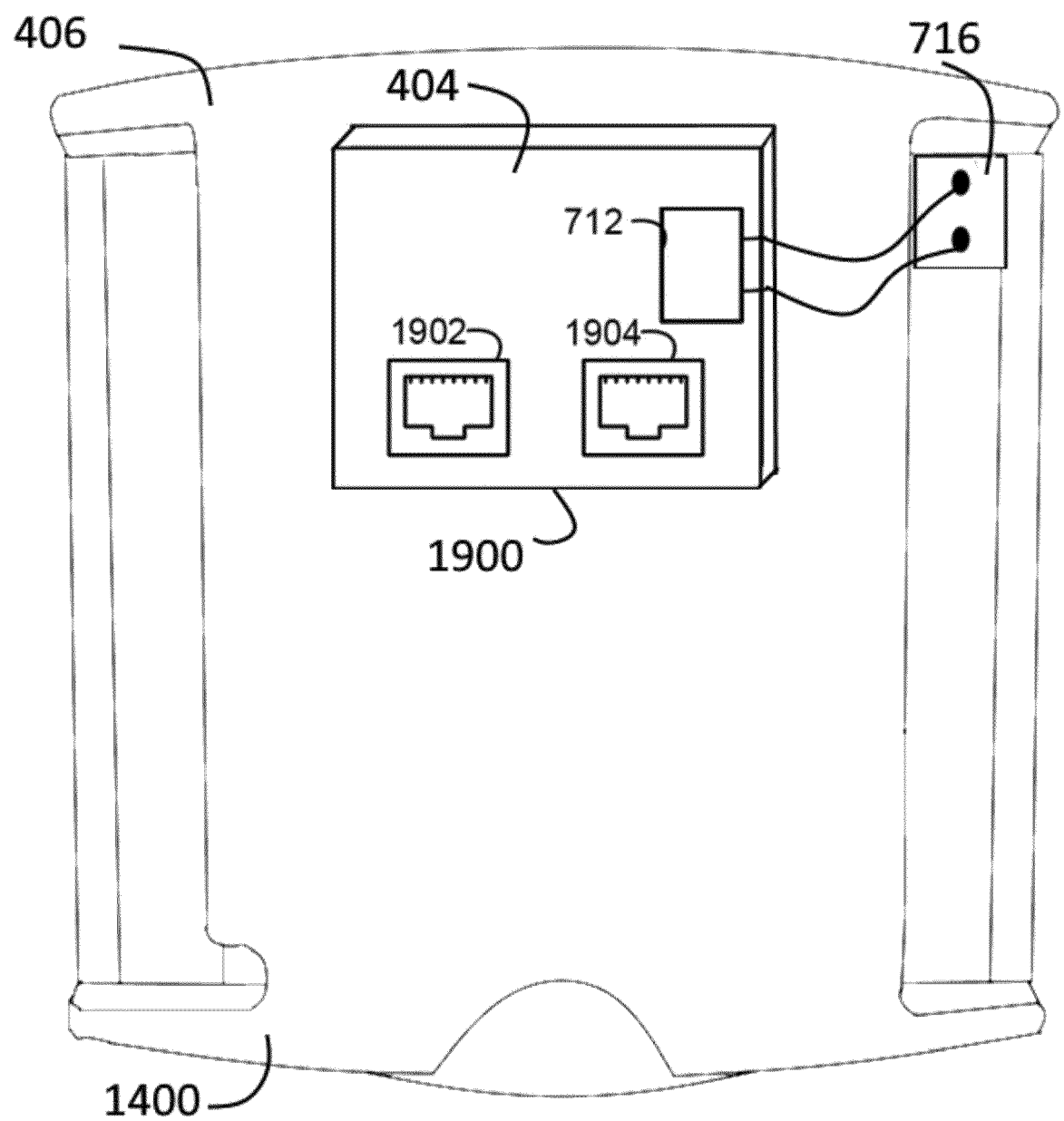
FIG. 19 is a perspective schematic drawing of the building controller of FIGS. 4-6 with the PoE adapter of FIGS. 4-6 connected to the faceplate of the building controller, according to some embodiments.

Referring now to FIG. 19, the PoE adapter 404 is shown connected to the cover-plate 1400 of the building controller 406, according to an exemplary embodiment. In some embodiments, the PoE adapter 404 includes an enclosure 1900 with Ethernet ports for connecting to, and mounting on, the cover-plate 1400. For example, male Ethernet connectors (not shown) of the PoE adapter 404 may connect to the Ethernet ports 714a and 714b to connect the PoE adapter 404 to the cover-plate 1400. The data communications of the male Ethernet connectors can be based on data received via Ethernet connectors 1902 and 1904 which may provide data and/or PoE to the PoE adapter 404. Furthermore, the power connector 712 connects AC power to the power connector 716 via one or more wires, the AC power generated by the PoE adapter 404 based on PoE received via the Ethernet connectors 1902 and/or 1904.

Figure 20:
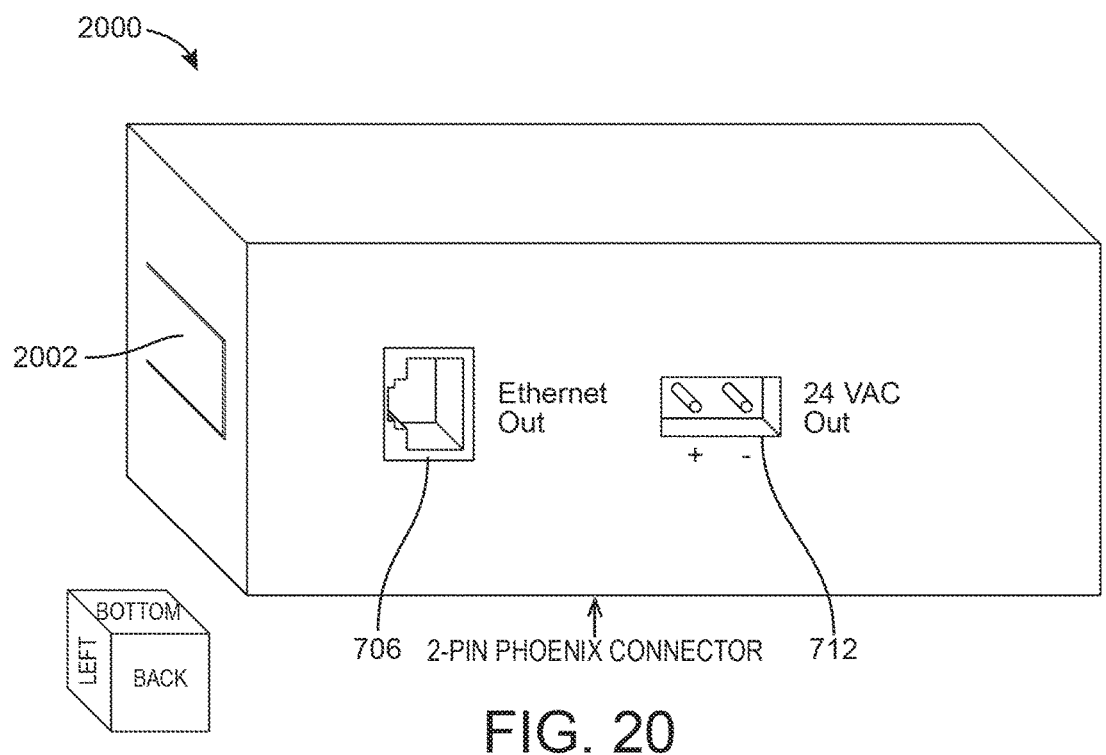
FIG. 20 is a front perspective schematic drawing of an enclosure of the PoE adapter of FIGS. 4-6, according to some embodiments.
Figure 21:
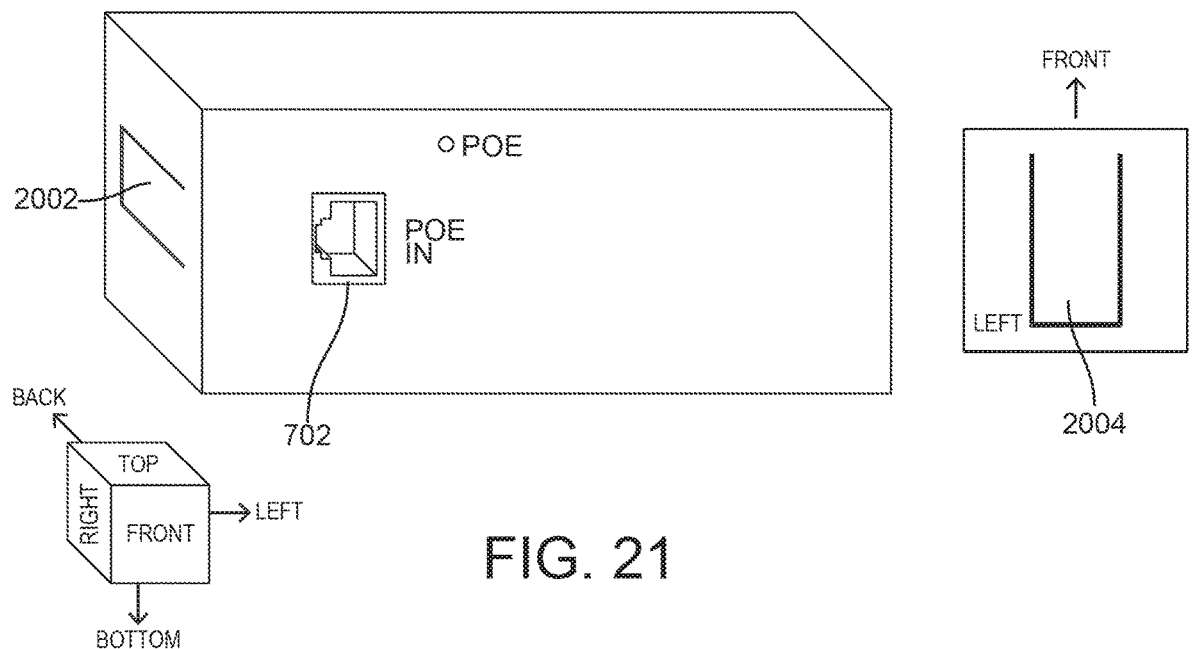
FIG. 21 is a back perspective schematic drawing and a side perspective drawing of the enclosure of the PoE adapter of FIGS. 4-6, according to some embodiments.

Referring now to FIGS. 20-21, an enclosure 2000 for the PoE adapter 404 is shown, according to an exemplary embodiment. The enclosure 2000 can include openings for the equipment Ethernet connector 706 and the power connector 712. In some embodiments, the power connector 712 is a 2-pin phoenix connector. The enclosure 2000 can include push and release tabs 2002 and 2004. The push and release tabs 2002 and 2004 can anchor the enclosure 2000 to an enclosure of a building controller and allow a user to detach the enclosure 2000.

Figure 22:
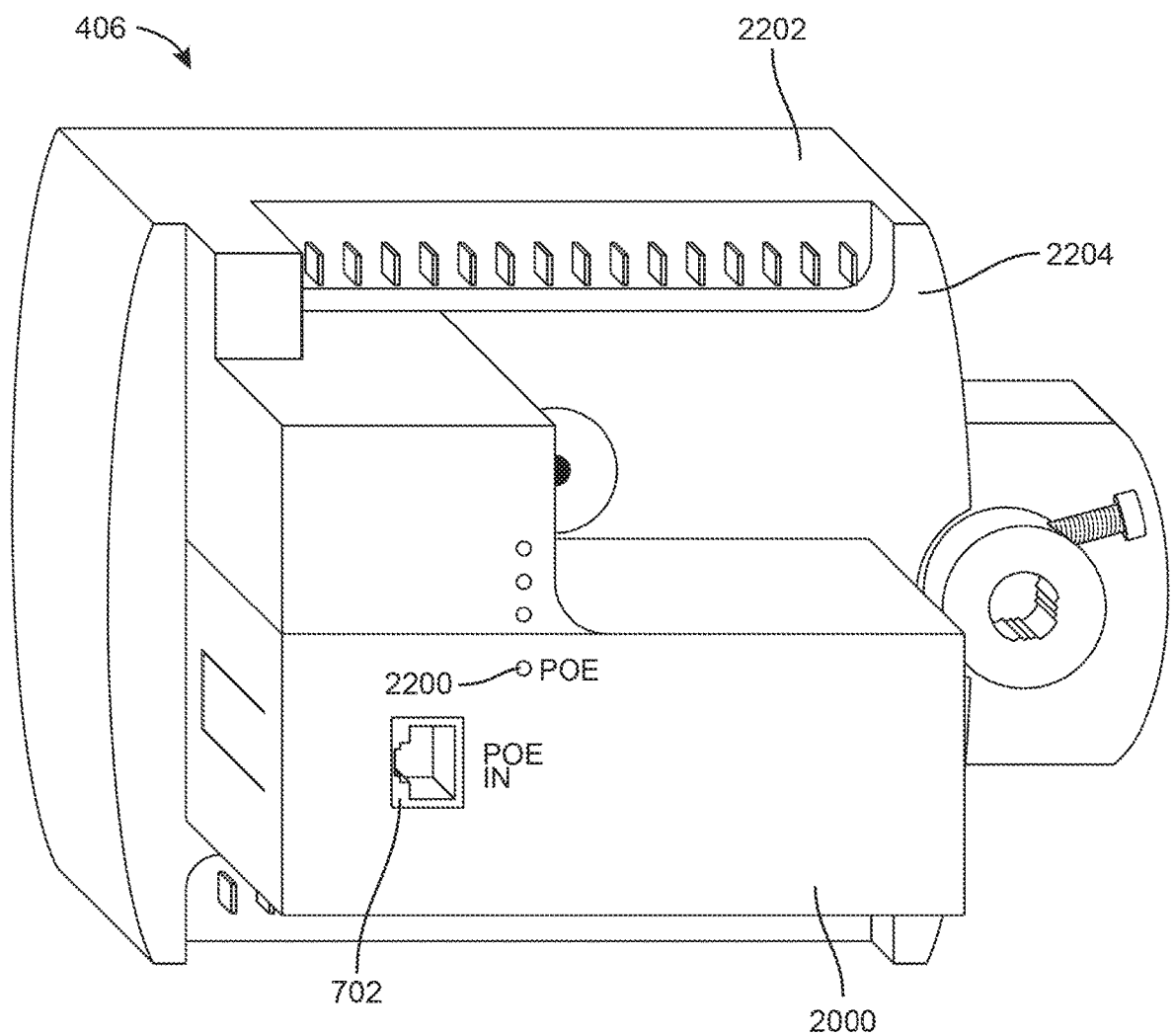
FIG. 22 is a perspective schematic drawing of the building controller of FIGS. 4-6 where the enclosure of the PoE adapter of FIGS. 20-21.

Referring now to FIG. 22, the building controller 406 is shown with the enclosure 2000 connected to a front plate 2202 of the building controller 406, according to an exemplary embodiment. The equipment Ethernet connector 706 and the power connector 712 connect to (snap into) connections of the front plate 2202 (the front plate 2202 in turn connected to a base enclosure 2202 of the building controller 406) anchoring the enclosure 2000 to the front plate 2004. In this regard, a user can snap the back of the enclosure 2000 into the front of the front plate 2202 causing the enclosure 2000 to become anchored. However, a PoE light 2200 and the source Ethernet connector 702 can be exposed. The PoE light 2200 may be illuminated by the LED, i.e., D2, of FIG. 7B. The front plate 2202 may be a specially designed adapter faceplate that can replace an existing front plate of the building controller 406 allowing the enclosure 2000 to be connected to the front plate of the building controller 406.

In ambit of the present disclosure, the functionality of the adapter circuit(s) may determine the functionality of the PoE adapter and therefore the terms PoE adapter circuit may be interchangeably used for the PoE adapter.

CONFIGURATION OF EXEMPLARY EMBODIMENTS

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

We claim:

1. A power over Ethernet (PoE) adapter for a building controller of a building management system, wherein said PoE adapter comprises:
   an adapter faceplate detachably coupled to said building controller; and
   one or more adapter circuits mounted on said adapter faceplate, wherein said one or more adapter circuits are configured to:
      receive PoE from a PoE source;
      generate alternating current (AC) power based on the PoE received from the PoE source; and
      provide the generated AC power to said building controller.

2. The power over Ethernet adapter as claimed in claim 1, wherein said one or more adapter circuits comprises:
   a power circuit; and
   an Ethernet breakout circuit configured to:
      provide one or more data communication connections between the PoE source and the building controller; and
      provide one or more PoE connections between the PoE source and said power circuit,
   wherein said power circuit is configured to generate the alternating current power based on the PoE received from the PoE source via the Ethernet breakout circuit.

3. The power over Ethernet adapter as claimed in claim 2, wherein said power circuit comprises:
   a step down unit configured to receive the PoE from the PoE source, and further configured to step down the received PoE to a second power; and
   an inverter unit configured to receive the second power from the step down unit, and further configured to convert the second power to the AC power.

4. The power over Ethernet adapter as claimed in claim 3, wherein
   said inverter unit includes at least one of a stable monovibrator and a transformer; and
   said step down unit includes at least one of a buck converter and a linear regulator.

5. The power over Ethernet adapter as claimed in claim 1, wherein said one or more adapter circuits is configured to generate the AC power at 24 volts and 0.8 amperes.

6. The power over Ethernet adapter as claimed in claim 1, wherein said one or more adapter circuits are mounted on an inner surface of said adapter faceplate, and said adapter faceplate is detachably coupled to an enclosure body of said building controller.

7. A building controller for a building management system, said building controller comprising:
   one or more controller circuits configured to operate one or more building equipment of said building management system, wherein said one or more controller circuits is powered via alternating current (AC) power; and a power over Ethernet (PoE) adapter configured to:
  receive PoE from a PoE source, wherein said PoE source is configured to provide the PoE having direct current power;
  generate the AC power based on the PoE received from the PoE source; and
  provide the generated AC power to said one or more controller circuit circuits, wherein the power over Ethernet adapter comprises:
    a power circuit and
    an Ethernet breakout circuit configured to:
      provide one or more data communication connections between the PoE source and the building controller; and
      provide one or more PoE connections between the PoE source and said power circuit,
      wherein said power circuit is configured to generate the AC power based on the PoE received from the PoE source via the Ethernet breakout circuit.

8. The building controller as claimed in claim 7, wherein said building controller is housed within an enclosure comprising:
  an enclosure body; and
  an enclosure faceplate detachably coupled to said enclosure body, wherein said PoE adapter is attached to the enclosure faceplate.

9. The building controller as claimed in claim 7, wherein said power circuit comprises:
  a step down unit configured to receive the PoE from the PoE source, and further configured to step down the received PoE to a second power, wherein said step down unit is at least one of a buck converter and a linear regulator; and
  an inverter unit configured to receive the second power from the step down unit, and is further configured to convert the second power to AC power, wherein said inverter unit is at least one of an a stable monovibrator and a transformer.

10. The building controller as claimed in claim 9, wherein said power circuit comprises a heat sink configured to facilitate dissipation of heat generated by at least one of said step down unit and said inverter unit.

11. An adapter faceplate for a building controller housed within an enclosure body, said adapter faceplate configured to be detachably coupled to said enclosure body to cover an opening thereof, wherein said adapter faceplate is configured to house a power over Ethernet (PoE) adapter configured to:
  receive PoE from a PoE source, wherein said PoE source is configured to generate the PoE having direct current power;
  generate alternating current (AC) power based on the PoE received from the PoE source; and
  provide the generated AC power to one or more controller circuits.

12. The adapter faceplate as claimed in claim 11, wherein said adapter faceplate is defined by a plate and sidewalls extending from edges of said plate defining a space therebetween.

13. The adapter faceplate as claimed in claim 12, wherein said PoE adapter is positioned within the defined space, and is mounted on an operative inner surface of the plate.

14. A building management system comprising:
  a power over Ethernet (PoE) source configured to generate PoE;
  a PoE adapter electrically connected to the PoE source to receive the generated PoE, said PoE adapter comprising one or more circuits configured to generate alternating current power based on the PoE received from the PoE source; and
  a building controller electrically connected to the PoE adapter, wherein the building controller is enabled to be powered by alternating current (AC) power generated by the PoE adapter to operate one or more building equipment, and wherein the building controller is housed within an enclosure comprising:
    an enclosure body; and
    an enclosure faceplate detachably coupled to said enclosure body, wherein said PoE adapter is mounted on an outer surface of the enclosure faceplate.

15. The building management system as claimed in claim 14, wherein the PoE provided by the PoE source is 48 volts DC and the AC power generated the PoE adapter is 24 volts.

16. The building management system as claimed in claim 14, wherein said PoE adapter comprises:
  a power circuit; and
  an Ethernet breakout circuit configured to:
    provide one or more data communication connections between the PoE source and the building controller; and
    provide one or more PoE connections between the PoE source and said power circuit,
  wherein said power circuit is configured to generate the AC power based on the PoE received from the PoE source via the Ethernet breakout circuit.

17. The building management system as claimed in claim 16, wherein said power circuit comprises:
  a step down unit configured to receive the PoE from the PoE source, and further configured to step down the received PoE to a second power; and
  an inverter unit configured to receive the second power from the step down unit, and further configured to convert the second power to AC power.

18. A building management system comprising:
  a power over Ethernet (PoE) source configured to generate PoE;
  a PoE adapter electrically connected to the PoE source to receive the generated PoE, said PoE adapter comprising one or more circuits configured to generate alternating current power based on the PoE received from the PoE source; and
  a building controller electrically connected to the PoE adapter, wherein the building controller is enabled to be powered by alternating current (AC) power generated by the PoE adapter to operate one or more building equipment, wherein said building controller is housed within an enclosure comprising:
    an enclosure body; and
    an enclosure faceplate detachably coupled to said enclosure body, wherein said PoE adapter is mounted on an inner surface of the enclosure faceplate, and is positioned within a space defined by the enclosure faceplate.

19. A building management system comprising:
  a power over Ethernet (PoE) source configured to generate the PoE;
  a PoE adapter electrically connected to the PoE source to receive the generated PoE, said PoE adapter comprising one or more circuits configured to generate alternating current power based on the PoE received from the PoE source; and a building controller electrically connected to the PoE adapter, wherein the building controller is enabled to be powered by the alternating current (AC) power generated by the PoE adapter to operate one or more building equipment, and wherein the building controller is housed within an enclosure comprising:

an enclosure body; and an enclosure faceplate detachably coupled to said enclosure body, wherein said PoE adapter is mounted on an outer surface of the enclosure faceplate, and wherein said PoE adapter comprises:

a power circuit comprising a heat sink configured to facilitate dissipation of heat generated by at least one of a step down unit and an inverter unit.

20. The building management system of claim 19 wherein the one or more circuits comprises:

a power circuit; and an Ethernet breakout circuit configured to:

provide one or more data communication connections between the PoE source and the building controller; and provide one or more PoE connections between the PoE source and said power circuit, wherein said power circuit is configured to generate the alternating current power based on the PoE received from the PoE source via the Ethernet breakout circuit.

* * * * *